US012722626B2

(12) United States Patent
Okabe

(10) Patent No.: US 12,722,626 B2
(45) Date of Patent: Sep. 1, 2026

(54) PARKING ASSISTANCE APPARATUS, PARKING ASSISTANCE METHOD, AND NON-TRANSITORY COMPUTER-READABLE RECORDING MEDIUM WITH PARKING ASSISTANCE PROGRAM RECORDED THEREIN

(71) Applicant: Panasonic Automotive Systems Co., Ltd., Kanagawa (JP)

(72) Inventor: Yoshimasa Okabe, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 86 days.

(21) Appl. No.: 18/924,204

(22) Filed: Oct. 23, 2024

(65) Prior Publication Data

US 2025/0136094 A1 May 1, 2025

(30) Foreign Application Priority Data

Oct. 26, 2023 (JP) ................................ 2023-183888

(51) Int. Cl.
*B60W 30/06* (2006.01)
*G06V 10/40* (2022.01)
*G06V 20/56* (2022.01)

(52) U.S. Cl.
CPC ............. *B60W 30/06* (2013.01); *G06V 10/40* (2022.01); *G06V 20/56* (2022.01)

(58) Field of Classification Search
None
See application file for complete search history.

(56) References Cited

U.S. PATENT DOCUMENTS

2009/0243889 A1* 10/2009 Suhr ...................... G08G 1/168 340/932.2
2011/0216194 A1* 9/2011 Kosaki ...................... B60R 1/27 348/148

(Continued)

FOREIGN PATENT DOCUMENTS

JP 08-087081 4/1996
JP 2003-315877 11/2003

(Continued)

OTHER PUBLICATIONS

Machine translation of JP-2018075866-A (Year: 2026).*

(Continued)

*Primary Examiner* — Jennifer M Anda
(74) *Attorney, Agent, or Firm* — Greenblum & Bernstein, P.L.C.

(57) ABSTRACT

A parking assistance apparatus includes: an image acquirer that acquires a camera image; a feature point detector that extracts feature points from the camera image; a feature point selector that selects a feature point to be registered on a map by evaluating the feature points in learning travel and a parking route and a parking position of the vehicle are registered on the map; and a vehicle controller that parks the vehicle based on the map, in which the feature point selector varies a priority for registration of the feature points or the number of feature points for registration in accordance with a position on the parking route, or selects, at the position on the parking route, the feature point to be registered on the map, based on a position of the camera or a relative position of the feature point with respect to an optical axis direction.

19 Claims, 23 Drawing Sheets

(56) References Cited

U.S. PATENT DOCUMENTS

| | | | | |
|---|---|---|---|---|
| 2011/0242311 | A1* | 10/2011 | Miyajima | G06F 18/28 348/116 |
| 2013/0085637 | A1* | 4/2013 | Grimm | B60W 30/06 701/25 |
| 2018/0246515 | A1* | 8/2018 | Iwama | G05D 1/0251 |
| 2019/0039605 | A1* | 2/2019 | Iio | B60W 30/06 |
| 2020/0191975 | A1* | 6/2020 | Watanabe | G01S 19/13 |
| 2022/0237927 | A1* | 7/2022 | Hiei | G06V 10/60 |
| 2024/0135815 | A1* | 4/2024 | Nakashima | G08G 1/143 |
| 2025/0018933 | A1* | 1/2025 | Watanabe | G06T 7/20 |
| 2025/0171014 | A1* | 5/2025 | Okabe | B60W 50/14 |
| 2025/0378583 | A1* | 12/2025 | Eguchi | G06T 7/85 |

FOREIGN PATENT DOCUMENTS

| | | | |
|---|---|---|---|
| JP | 2011-134058 | | 7/2011 |
| JP | 2013-530867 | | 8/2013 |
| JP | 2017-138664 | | 8/2017 |
| JP | 2018-075866 | | 5/2018 |
| JP | 2018075866 A | * | 5/2018 |
| JP | 2018-111377 | | 7/2018 |
| JP | 2018111377 A | * | 7/2018 |
| JP | 2019-045364 | | 3/2019 |
| JP | 2022-114526 | | 8/2022 |

OTHER PUBLICATIONS

Machine translation of JP-2018111377-A (Year: 2026).*

English language translation of Office Action from Japan Patent Office (JPO) in Japanese Patent Appl. No. 2023-183888, dated Dec. 17, 2014.

English language translation of Office Action from Japan Patent Office (JPO) in Japanese Patent Appl. No. 2023-183888, dated Apr. 22, 2025.

* cited by examiner

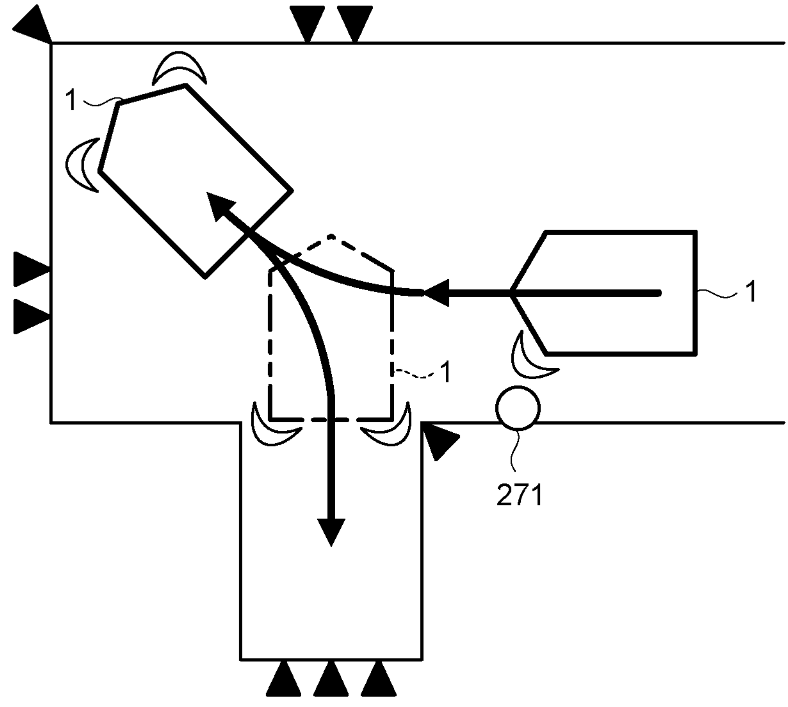
FIG. 26
(Amended)

PARKING ASSISTANCE APPARATUS, PARKING ASSISTANCE METHOD, AND NON-TRANSITORY COMPUTER-READABLE RECORDING MEDIUM WITH PARKING ASSISTANCE PROGRAM RECORDED THEREIN

TECHNICAL FIELD

The present disclosure relates to a parking assistance apparatus, a parking assistance method, and a non-transitory computer-readable recording medium with a parking assistance program recorded therein.

BACKGROUND ART

Patent Literature (hereinafter referred to as "PTL") 1 discloses a method of registering only feature points around a parking position on a map and not registering feature points in the vicinity of a parking start position on the map. In addition, Patent Literature 2 discloses a method of registering a larger number of the feature points on a map as a parking position is closer.

The technologies disclosed in PTLs 1 and 2 are intended to obtain an effect of reducing the capacity of the map or reducing the amount of calculation in automatic parking by eliminating or reducing the number of feature points registered on the map at a position away from the parking position, in view of the fact that the accuracy in the position estimation is required to be higher as the position is closer to the parking position.

CITATION LIST

Patent Literatures

PTL 1
Japanese Patent Application Laid-Open No. 2022-114526A

PTL 2
Japanese Patent Application Laid-Open No. 2018-75866A

SUMMARY OF INVENTION

Technical Problem

Problems to be Solved by the Invention

However, in the technologies of PTLs 1 and 2, since there is no consideration in which the accuracy to be obtained varies depending on an angle with respect to an optical axis direction of a camera, the difference in height between a feature point and the camera affects the position accuracy, and the like, the position accuracy may be deteriorated even at the parking position. In addition, there is no consideration for requiring the position accuracy even at a position away from the parking position, such as a case where the cut-back is made at a position where an obstacle is avoided during the backward parking or a case where the vehicle passes through the side of the obstacle on the way to the cut-back position.

In addition, since there is no consideration in which the necessity of the accuracy is different between the position accuracy in a front-rear direction of a vehicle and the position accuracy in a left-right direction, and the direction in which the feature point contributes to the position accuracy is different depending on an azimuth of the feature point with respect to the vehicle, a feature point at a position advantageous for obtaining the position accuracy in the direction requiring the accuracy may not be appropriately registered on the map at the position requiring the accuracy.

An object of the present disclosure is to provide a parking assistance apparatus, a parking assistance method, and a recording medium recording a parking assistance program each capable of selecting a feature point such that the accuracy in automatic parking is improved.

Solution to Problem

To solve the above-described problem, a parking assistance apparatus according to one aspect of the present disclosure includes: an image acquirer that acquires a camera image from each of cameras for viewing in different directions respectively around a vehicle; a feature point detector that extracts feature points from the camera image; a feature point selector that selects a feature point to be registered on a map by evaluating the feature points in learning travel in which the vehicle is manually parked and a parking route and a parking position of the vehicle are registered on the map; and a vehicle controller that parks the vehicle based on the map in automatic parking, in which the feature point selector varies a priority for registration of the feature points or the number of feature points for registration in accordance with a position on the parking route, or selects, at the position on the parking route, the feature point to be registered on the map, based on a position of the camera or a relative position of the feature point with respect to an optical axis direction of the camera.

A parking assistance method according to one aspect of the present disclosure includes: acquiring a camera image from each of cameras for viewing in different directions respectively around a vehicle; extracting feature points from the camera image; selecting a feature point to be registered on a map by evaluating the feature points in learning travel in which the vehicle is manually parked and a parking route and a parking position of the vehicle are registered on the map; and parking the vehicle based on the map in automatic parking, in which the selecting the feature point varies a priority for registration of the feature points or the number of feature points for registration in accordance with a position on the parking route, or selects, at the position on the parking route, the feature point to be registered on the map, based on a position of the camera or a relative position of the feature point with respect to an optical axis direction of the camera.

A non-transitory computer-readable recording medium, according to one aspect of the present disclosure, stores therein a parking assistance program for causing a computer to execute processing, the processing including: acquiring a camera image from each of cameras for viewing in different directions respectively around a vehicle; extracting feature points from the camera image; selecting a feature point to be registered on a map by evaluating the feature points in learning travel in which the vehicle is manually parked and a parking route and a parking position of the vehicle are registered on the map; and parking the vehicle based on the map in automatic parking, in which the selecting the feature point varies a priority for registration of the feature points or the number of feature points for registration in accordance with a position on the parking route, or selects, at the position on the parking route, the feature point to be registered on the map, based on a position of the camera or a relative position of the feature point with respect to an optical axis direction of the camera.

Advantageous Effects of Invention

According to the present disclosure, a feature point can be selected such that the accuracy in automatic parking is improved.

BRIEF DESCRIPTION OF DRAWINGS

FIG. 26 illustrates a scene in which the vehicle requires the accuracy in the left-right direction;

DESCRIPTION OF EMBODIMENTS

Figure 1:
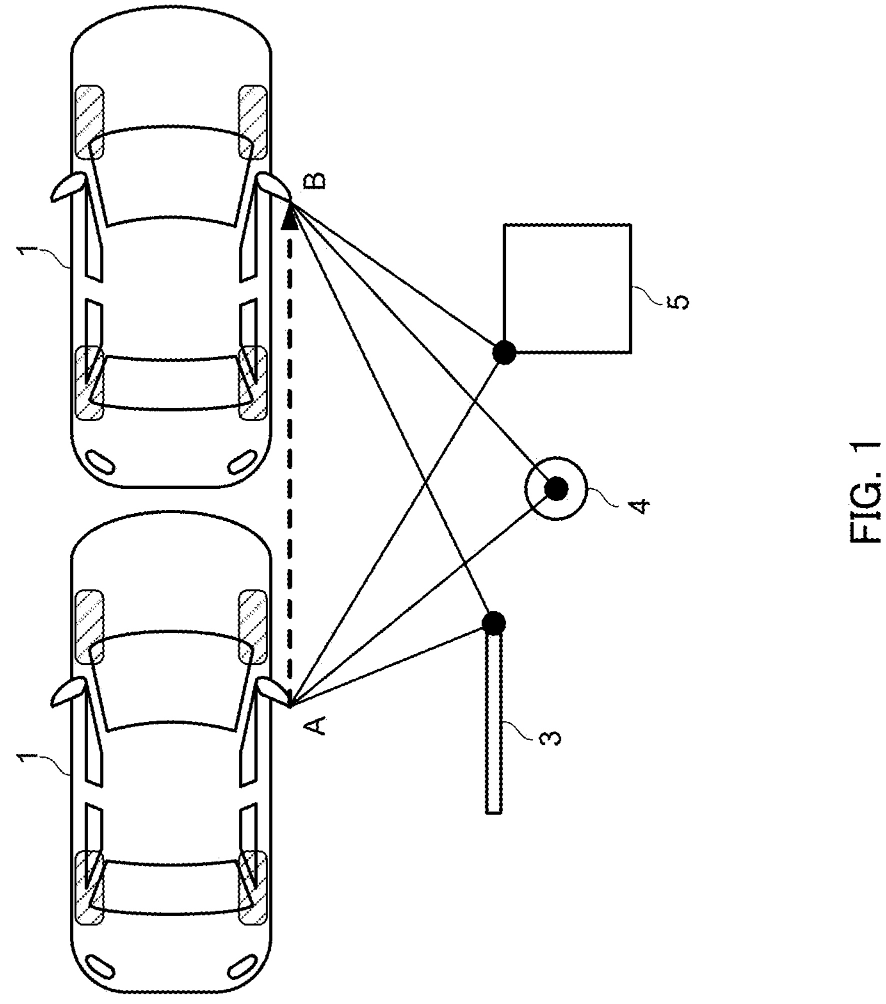
FIG. 1 illustrates an example of feature point detection performed by a parking assistance apparatus according to the present embodiment.

Hereinafter, an embodiment of the present disclosure will be described with reference to the accompanying drawings. Any embodiment described below show a specific example of the present disclosure. Therefore, each component, the arrangement position of each component and the connection form, as well as each step and the order of each step, or the like, shown in the following embodiment is an example and is not intended to limit the present disclosure. In addition, components that are not described in the independent claims among components in the following embodiment are described as optional components.

Each drawing is a schematic diagram and is not necessarily a strict illustration. In each drawing, the same reference numerals are attached to the substantially same configuration, and redundant explanations are not shown or simplified.

FIG. 1 illustrates an example of feature point detection performed by a parking assistance apparatus according to the present embodiment. In a learning-type automatic parking, once manual parking is performed to store a start position and a parking route, the same parking route can be automatically traveled and parking can be thus performed by only activating the automatic parking function at the same start position.

More specifically, vehicle 1 including the parking assistance apparatus generates a map including feature points in a case of manual parking (referred to as learning travel) and travels while estimating a position and a posture of vehicle 1 using the map in automatic parking. Each feature point registered on the map is a point representing the subject captured in a camera image, and is a point by which a position of the subject (image) can be specified. FIG. 1 shows a state in which an image of a subject is captured by right camera 2*a* described below, which is provided in a right side mirror of vehicle 1. An image captured by the camera is referred to as a camera image.

The feature point is a point by which a position can be specified in an image captured in the camera image. For example, as shown in FIG. 1, in a case where there is linear image 3, a terminal point thereof may be set as the feature point, in a case where there is circular image 4, a center point thereof may be set as the feature point, and in a case where there is polygonal image 5, a corner thereof may be set as the feature point. Since the camera image may be a color image or a black and white image, the parking assistance apparatus may use a change point in brightness as the feature point or may use a change point in hue as the feature point. Since a position of the feature point captured in the camera image depends on an azimuth of the feature point with vehicle 1 as a reference, the parking assistance apparatus can calculate the azimuth of the feature point from the camera image.

In a case where vehicle 1 proceeds and the position of right camera 2*a* moves from point A to point B, the azimuth of the feature point is changed. In this case, the position of each feature point can be specified by applying the principle of the triangulation to each feature point with line segment AB as the base line. A large number of pairs of the features (color or shape) and the positions (coordinates) of feature points are registered on the map.

Figure 2:
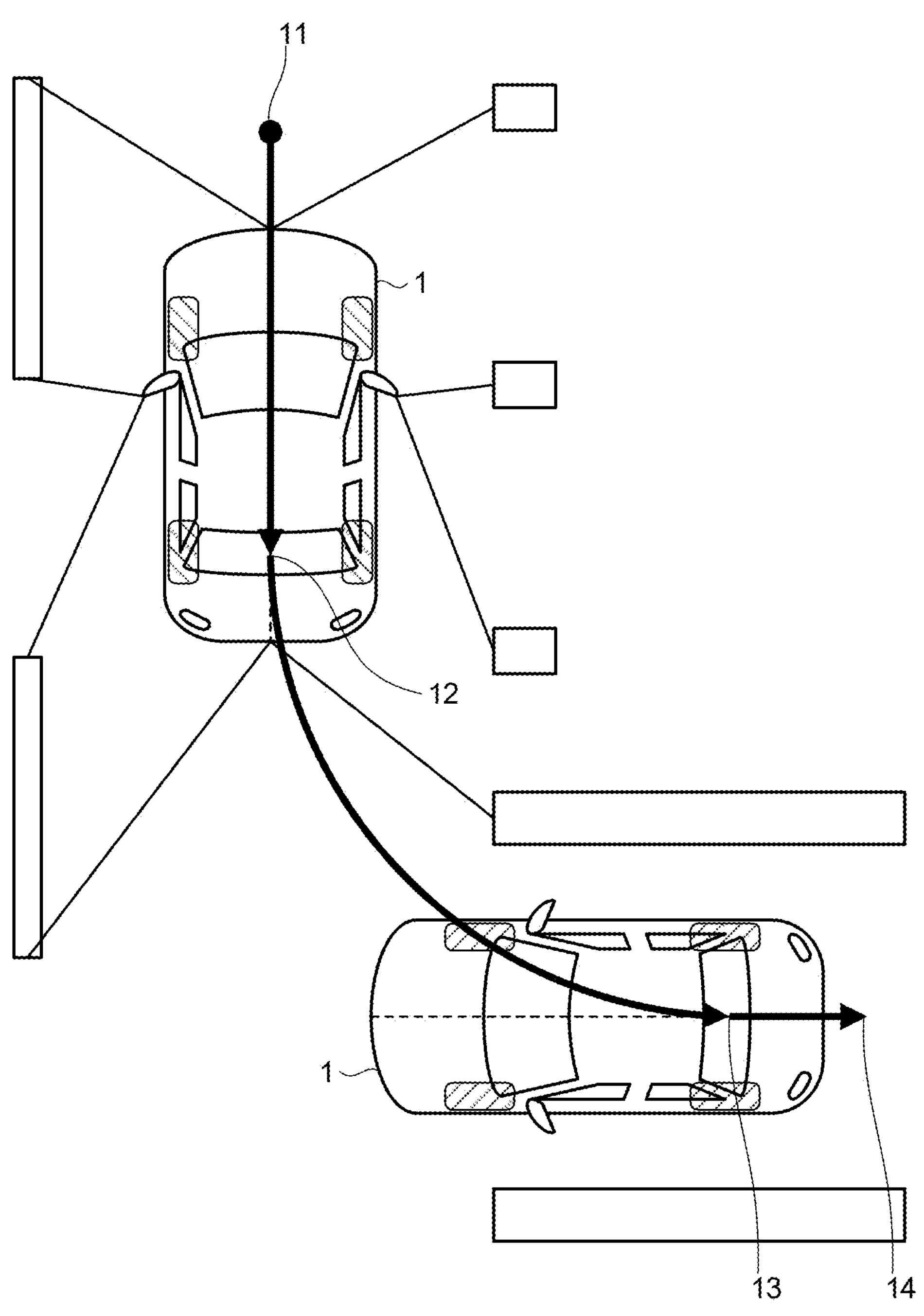
FIG. 2 illustrates automatic parking by self-position estimation according to the present embodiment.

FIG. 2 illustrates automatic parking by self-position estimation in the present embodiment. In the learning-type automatic parking, a map including data of a parking route during the learning travel, and, in a case of the automatic parking, travel is performed in accordance with the parking route registered on the map. For example, the parking assistance apparatus may register the parking route as a set of points, such as start position 11, parking position 14, and start point 12 and end point 13 of a curved line section, or may register the parking route as a combination of a straight line section and the curved line section. The curved line section may be accompanied by information on the steering angle or the rotation radius. In addition, a position of a feature point captured by the camera on the parking route is also registered on the map.

That is, the feature point and the parking route are registered on the map. The feature point registered on the map will be referred to as a marker in order to distinguish from the feature point detected from the camera image. It may be said in other words that the marker and the parking route are registered on the map.

In a case where there are many markers and the markers are present in all directions of the vehicle, it is possible to follow the parking route while accurately estimating the position of the vehicle and park the vehicle at an accurate position. However, in a case where the number of markers is restricted due to a storage capacity, an error in the estimated position of the vehicle is increased, and the parking route or parking position 14 may be shifted and/or automatic parking may fail.

The present embodiment discloses a method of selecting feature points to be registered on the map such that the accuracy in the automatic parking is improved, by focusing on the fact that the accuracy in the automatic parking route and/or parking position 14 is changed depending on the selection of the feature points to be registered on the map. Since the selection of the feature points is premised on the registration of the feature points on the map, the selection of the feature points to be registered on the map may be simply referred to as the selection of the feature points. For example, it may be said in other words that the method disclosed in the present embodiment is a method of selecting feature points such that the accuracy in the position estimation is improved.

The map generation method according to the present embodiment is to preferentially register the feature points located within a predetermined range with respect to the camera provided in vehicle 1, on the map, and the predetermined range is determined based on at least one of an optical axis direction of the camera or a position of the camera.

Since the range in which the angle with respect to the optical axis of the camera is small is a direction from which an angle of the feature point can be accurately specified, in a case where a feature point in the direction is registered on the map, it is advantageous in controlling the steering angle. A feature point having a small difference in height from the camera is advantageous for controlling the steering angle because the angle of the feature point detected is less likely to be affected even in a case where the posture of the vehicle varies. A feature point having a small distance from the camera is advantageous for accurately estimating the position because the amount of change in angle of the feature points detected when the position of the camera varies is large.

For example, with respect to the position of the camera and the optical axis of the camera at a time when vehicle 1 is parked during the learning travel, in a case where a feature point that is close to the camera, is close to the optical axis of the camera, and has a small difference in height from the camera is selected and registered on the map, vehicle 1 can be stopped at the same position with high accuracy in a case of the automatic parking. In addition, a position and a direction that require the position accuracy may be specified, a position of a feature point advantageous for obtaining the accuracy of the direction at the position may be specified, and a feature point at a more advantageous position may be preferentially selected, whereby the required accuracy may be obtained with a small number of the feature points. The method of specifying the position and the direction requiring the position accuracy will be described after the following configuration example.

Figure 3:
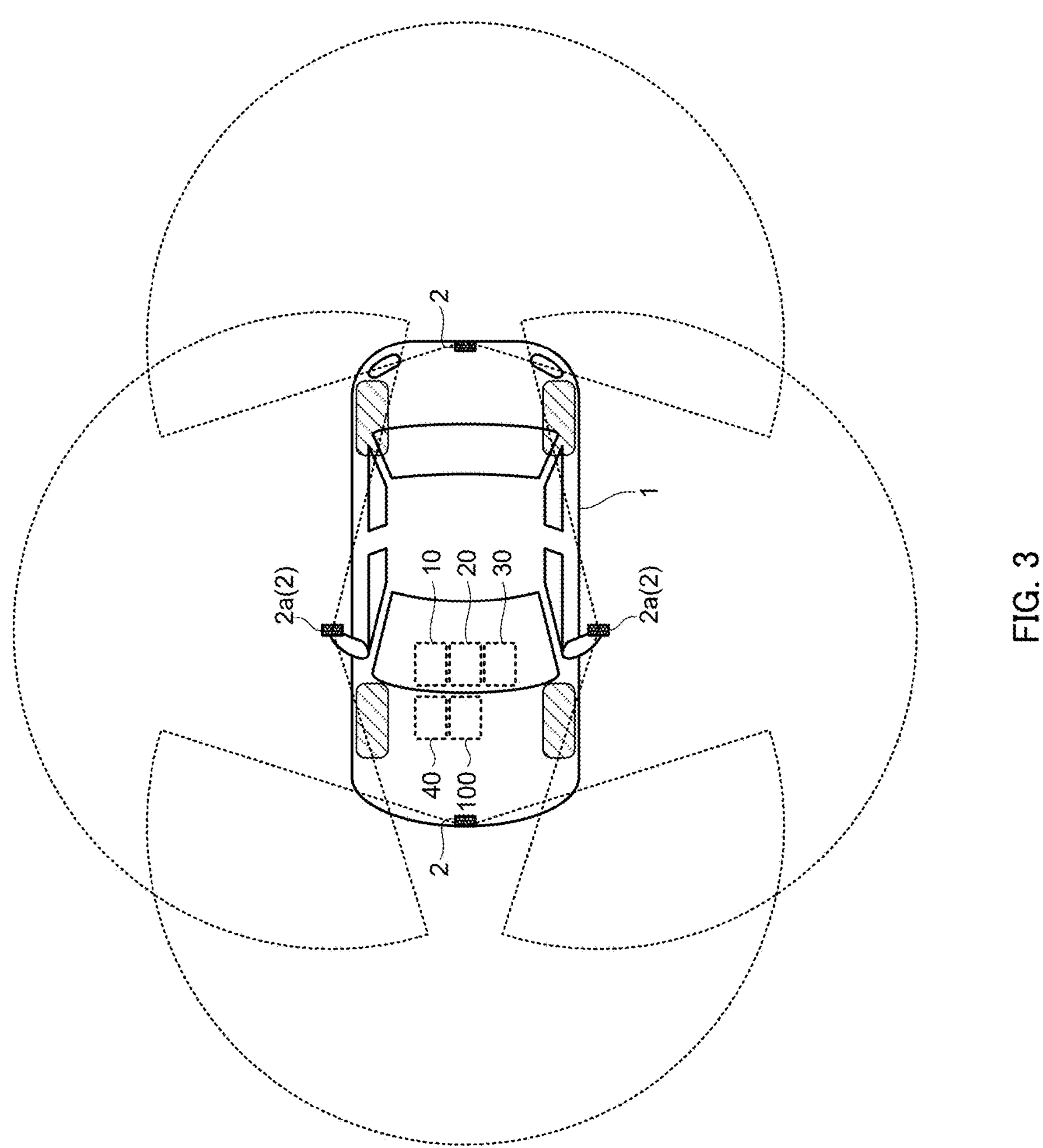
FIG. 3 illustrates a vehicle to which the parking assistance apparatus according to the present embodiment can be applied.

FIG. 3 illustrates a vehicle to which the parking assistance apparatus according to the present embodiment can be applied. Cameras 2 are provided at four locations of the front, rear, left, and right of the vehicle body of vehicle 1. Each camera 2 includes a fisheye lens and has a visual field range of 180 degrees or more in the horizontal direction (see broken line).

Each camera 2 is mounted with a depression angle to capture a road surface, and when a capturing range of the road surface is converted to the visual field in the horizontal direction, single camera 2 captures the road surface in the range of about 240 degrees. For example, the front wheels and the rear wheels and side surfaces of the vehicle are captured in captured images of side cameras 2*a* provided on the left and right of the vehicle.

Figure 4:
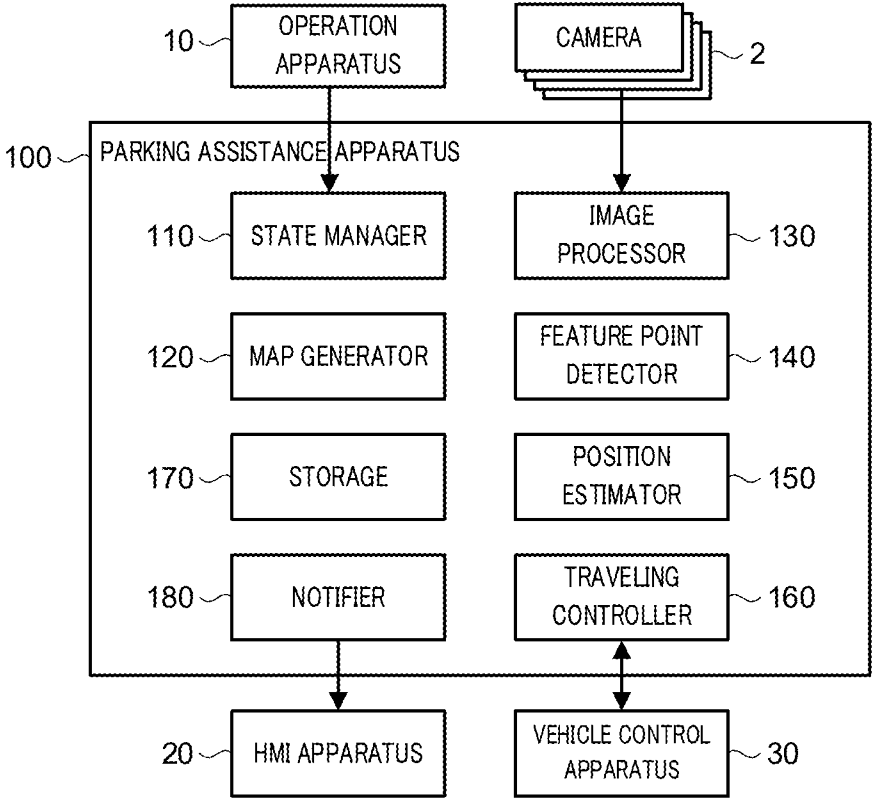
FIG. 4 is a block diagram illustrating the parking assistance apparatus according to the present embodiment.

FIG. 4 is a block diagram showing parking assistance apparatus 100 in the present embodiment. Camera 2 outputs a captured camera image, and image processor 130 of parking assistance apparatus 100 receives the camera image to perform generation of a display image and the like. Image processor 130 may be referred to as an image acquirer. The display image is output from notifier 180 to HMI apparatus 20, and notifier 180 superimposes a message on the display image or outputs a voice message in response to an instruction from state manager 110. State manager 110 receives a user operation by operation apparatus 10, and controls the functions of parking assistance apparatus 100 in response to the user operation. Here, the touch panel of navigation apparatus 40 is included in operation apparatus 10.

State manager 110 receives position information from the main body (not shown) of navigation apparatus 40. In a case of performing learning travel, map generator 120 generates a map. Map generator 120 appends the position information acquired by navigation apparatus 40 with a global positioning system (GPS) to the map and records the appended map in storage 170. In this manner, when the learning travel is performed, the position information of navigation apparatus 40 and the position information appended to the map are compared with each other, so that the map to be used for the automatic parking can be selected.

Image processor 130 generates a display image and a detection image. The detection image is, for example, an image with enhanced change in brightness or color, and may be an image obtained by adding processing of extracting a contour line or an edge. Feature point detector 140 extracts feature points from the detection image. Since each feature point is not a point inside the plane of the image or a point in the middle of the side but is a point at a corner or an end where the position can be specified, it is sufficient to extract the contour line of the image and specify the corner or the end. Information on the feature points detected by feature point detector 140 includes information on a color or a shape of the image and information on positions of the feature points on the camera image. Map generator 120 registers the information on the feature points in a case of generating the map, but registers only a selected feature point on the map after evaluating the feature points. Since map generator 120 selects a feature point to be registered on the map, map generator 120 may be referred to as a feature point selector.

The color information on a feature point may include a color on an acute angle side and a color on an obtuse angle side in a case where the feature point is a corner portion. In addition, in a case where the feature point is the end of the line, the color information on the feature point may include the color of the line and the color of the background. Since the feature point specifies and sets the position of the image on the image, a sharp image, that is, an image having high contrast is preferable. Feature points detected from the image having a low contrast may change in position depending on the conditions such as the light source and may not be detected, and thus are not preferable as the feature points to be registered on the map. Therefore, such feature points may be excluded in the stage of detecting the feature points.

For example, since the position of a boundary line between a portion where light is incident and a shadow varies depending on a direction of a ray in an image of an object having a gentle curved surface, in a case where a feature point on the boundary line is registered on a map, this may cause a position estimation error. Therefore, map generator 120 may capture that the boundary between the light and the shadow is like a gradation (that is, the contrast is low) and not register such feature points.

In addition, map generator 120 may include the goodness as the feature point in the information on the feature point as a basic score of the feature point, and may perform evaluation by adding the basic score to the evaluation value based on the position of the feature point in a case of selecting a feature point to be registered on the map. Alternatively, map generator 120 may select a feature point having a higher basic score in a case where there are a plurality of feature points having the equal evaluation based on the position of each feature point.

In a case where only the feature points in the same direction with respect to vehicle 1 are selected, there may be no difference in azimuths of the feature points as viewed from vehicle 1. Since the principle of the triangulation specifies the position by the difference in the azimuths of the feature points, in a case where the distribution of the feature points is biased, the position of vehicle 1 may not be specified or the accuracy in the position estimation may be reduced.

Therefore, the position and/or direction of the feature points to be selected is not concentrated on a specific position and/or direction. For example, map generator 120 sets an interval threshold value that restricts the interval between the feature points to be selected, and after selecting a certain feature point, map generator 120 does not select a feature point of which the distance from the certain feature point is less than the interval threshold value.

Alternatively, when selecting a certain feature point, map generator 120 performs lateral suppression of reducing the evaluation value as the distance from the certain feature point is smaller, and makes it difficult to select a feature point near the selected feature point. By setting such an interval threshold value or the lateral suppression characteristic for each position or section on the parking route, the number or density of the selected feature points can be controlled.

In addition, map generator 120 may add the evaluation value to a feature point at the position necessary for obtaining the position accuracy, in accordance with the scene that occurs on the parking route, so that the feature point at the necessary position is easily selected. Alternatively, map generator 120 may change the interval threshold value or the lateral suppression characteristic between the position requiring the position accuracy and the position not requiring the position accuracy such that the number or density of the feature points to be registered on the map is increased at the position requiring the position accuracy. The setting for controlling the number or density of the selected feature points may be referred to as point assignment. For example, map generator 120 efficiently secures the required position accuracy by performing the point assignment in accordance with the position on the parking route, i.e., increasing the assignment point in the vicinity of the parking position or the cut-back position and reducing the assignment point to the other positions.

In a case where the learning travel is started, map generator 120 temporarily stores feature points detected at start position 11 of the learning travel in storage 170. Since the storage of the feature points detected at start position 11 is not the final registration on the map, it may be referred to as temporary registration. The feature points to be registered on the map are determined after the learning travel is finished. Alternatively, unnecessary feature points among the temporarily registered feature points may be deleted after the learning travel is finished. Information on the feature points detected at start position 11 is necessary for specifying the position and the posture of vehicle 1 in a case where the automatic parking is started.

In a case where vehicle 1 starts the learning travel, map generator 120 tracks the positions of the feature points on the camera image. For example, as shown in FIG. 1, map generator 120 compares the feature points captured in the camera image at time point A with the feature points captured in the camera image at time point B subsequent to time point A to detect a pair of feature points in which the information on the color or shape of the feature points and a movement amount match. The match of the movement amount means that, on the assumption that a feature point at time point A is moved to a position of a feature point at time point B by movement of the vehicle, a movement direction and a movement distance of the feature point substantially correspond to a movement direction and a movement distance of the vehicle. The processing of associating the feature points having different imaging time points with each other is referred to as tracking. Since the change in position of the feature points forming the pair on the camera image is the motion parallax generated by the movement of vehicle 1 between time point A and time point B, the three-dimensional coordinates of the feature points can be specified by applying the principle of the triangulation to the motion parallax.

Map generator 120 further evaluates the feature points whose the three-dimensional coordinates can be specified, selects feature points that satisfy a predetermined condition, and registers the selected feature points on the map.

Storage 170 includes a volatile region and a non-volatile region, and the map is stored in the non-volatile region. Storing in the non-volatile region is also referred to as recording or registering.

In a case where the automatic parking is started, feature point detector 140 detects a feature point that matches the map by collating the information on the feature points detected by feature point detector 140 from the camera image (information on the color or the shape of the image, information on the positions of the feature points on the camera image, and the like) with the information on the feature points read out from the map. In a case where start position 11 of the automatic parking is close to the position where the learning travel is started and there is no large difference in the orientation of the vehicle, the positions of the feature points on the camera image at the time of starting the automatic parking is expected to have no large difference from the positions of the feature points on the camera image at the time of starting the learning travel. Since the difference in the positions of the feature points corresponds to the difference in the position and the orientation of the vehicle, it is possible to specify, from the difference in the positions of the feature points, how the position and the orientation of the vehicle differ between when the learning travel is started and when the automatic parking is started.

Specifically, the position of each feature point on the camera image corresponds to an angle of the feature point (an angle of a line connecting the feature point and the camera with respect to the optical axis direction), and indicates an angle at which the feature point is visible from vehicle 1. In a case where position estimator 150 collates the angles of the feature points in the four directions with the three-dimensional coordinates of the feature points on the map, the positions of the vehicle from which the feature points in the four directions appear at matching angle are limited to a specific range. Therefore, position estimator 150 specifies the position and the posture of vehicle 1 by obtaining the optimum solution of the position and the posture of vehicle 1 that match the angles of the plurality of feature points. This processing is referred to as self-position estimation. In addition, it may be said in other words that the degree to which the condition of the angles of the feature points is matched is the likelihood, and it may be said in other words that the processing of obtaining the optimum solution is the maximum likelihood estimation.

The self-position estimation may be processed using an existing method, and a detailed description thereof will not be shown. However, regardless of the method used, in a case where the coordinates of the feature points registered on the map deviate from the actual coordinates of the feature points or the angles of the feature points estimated from the positions at which the feature points are captured in the camera image deviate from the actual angles, the estimated position also deviates from the actual positions. In the self-position estimation by position estimator 150, in a case where a large number of feature points are used, a deviation of the position estimation is minimized even when there is a deviation in the information of some feature points, but in a case where the number of the feature points is small, the deviation of the position estimation may be significant.

Traveling controller 160 communicates with a vehicle control apparatus during the learning travel, acquires information on the rotation speed of the wheels or the steering angle, and calculates the movement amount and the movement direction of the vehicle for each unit time. For example, a small section is obtained by representing the movement amount and the movement direction of a vehicle for each unit time by a length and an orientation of a line segment. That is, the small section has data of the length and the orientation. The small section may be represented by the rotation speed of the wheel or the steering angle. Traveling controller 160 calculates the position, the posture, and the route of the vehicle every moment by integrating the data of the small sections.

Map generator 120 may receive route information in a unit of data of the small section from traveling controller 160, or may receive a parking route (a union of data of the small sections) at the time of parking. Since this parking route is polygonal in a broken line shape composed of small sections, both ends of each small section will be referred to as broken points. The parking route during the learning travel may be a union of data of fold points.

In a case of automatically parking the vehicle, traveling controller 160 estimates the position, the posture, and the route of the vehicle based on information, such as the rotation speed of the wheels and the steering angle, and outputs an instruction value to vehicle control apparatus 30 every moment such that the route of the vehicle reproduces the route at the time of learning travel. That is, the parking route when the automatic parking is performed is a reproduction of the parking route when the learning travel is performed.

In a case where the position and the posture of the vehicle are shifted from the position and the posture of the vehicle at the time of the learning travel, traveling controller 160 first controls the steering angle to change the steering angle such that a course intersects with the route at the time of the learning travel, and controls the steering angle such that the posture of the vehicle matches with the posture of the vehicle at the time of the learning travel in a case where the vehicle overlaps with the route at the time of the learning travel. That is, traveling controller 160 estimates the position, the posture, and the route of the vehicle, and performs feedback control on the steering angle such that the course of the vehicle follows the parking route in the learning travel. Therefore, traveling controller 160 may be referred to as a vehicle controller. Alternatively, position estimator 150 and storage 170 may be included in the vehicle controller, with a focus on parking the vehicle based on the map.

In a case of the automatic parking, traveling controller 160 may reproduce the vehicle speed at the time of the learning travel or may restrict the vehicle speed. This is because, in a case where the vehicle speed is high, the wheels may slip and deviate from the route. Traveling controller 160 may maintain, for example, the vehicle speed at 5 km/h.

Since position estimator 150 estimates the position and the posture of the vehicle separately from traveling controller 160, for example, in a case where it is estimated that the slip occurs based on the rotation speed of the wheels, the data of the position and the posture of the vehicle of traveling controller 160 may be overwritten with the data of the position and the posture estimated by position estimator 150 to correct the subsequent steering angle control.

Figure 5:
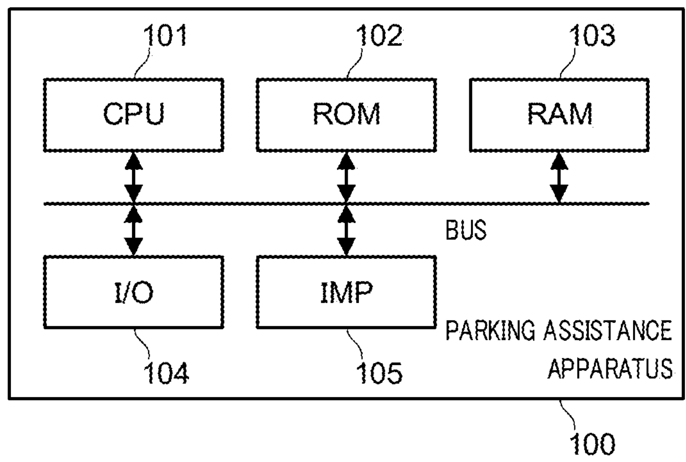
FIG. 5 illustrates a hardware configuration of the parking assistance apparatus according to the present embodiment.

FIG. 5 illustrates a hardware configuration of parking assistance apparatus 100 according to the present embodiment. The function of parking assistance apparatus 100 may be mounted on the hardware shown in FIG. 5. Parking assistance apparatus 100 may be a computer including CPU 101, ROM 102, RAM 103, I/O (input/output interface) 104, and IMP (Image Processor) 105, which are connected to each other via a bus.

Parking assistance apparatus 100 may be configured to accommodate a plurality of elements in one chip or to constitute one element with a plurality of chips. A plurality of types of buses may be combined instead of a single bus. For example, CPU 101, ROM 102, RAM 103, and IMP 105 may be housed in one chip and connected via a parallel bus, and I/O 104 may be constituted of a plurality of chips and connected to the chip housing CPU 101 via a serial bus.

CPU 101 controls entire parking assistance apparatus 100. The functions of each part of parking assistance apparatus 100 may be implemented in the form of a program to be executed by CPU 101. ROM 102 and RAM 103 correspond to a storage, and ROM 102 corresponds to a non-volatile region. RAM 103 is used for temporary storage as the work area of CPU 101. For example, camera images such as a display image and a detection image, information on detected feature points, and the like are temporarily stored in RAM 103. IMP 105 is a processor whose processing performance is improved by specializing in image processing or parallel processing, and IMP 105 may execute the processing of image processor 130, feature point detector 140, position estimator 150, and the like. That is, the parking assistance apparatus shown in FIG. 4 may be realized by a combination of hardware as shown in FIG. 5 and a program executed on the hardware.

Figure 6:
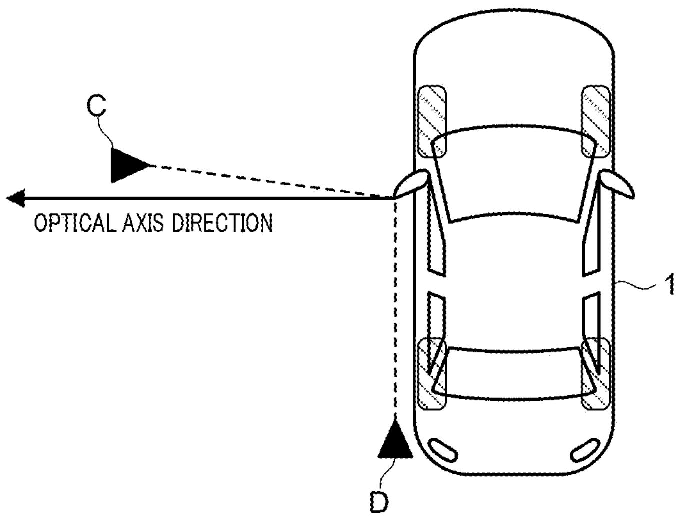
FIG. 6 illustrates a positional relationship between a vehicle and an object.

Here, a relationship between the direction and the accuracy of a feature point will be described. FIG. 6 illustrates a positional relationship between vehicle 1 and an object. An optical axis of side cameras **2*a*** housed in the left side mirror portion is directed to a direction perpendicular to a front-rear axis of the vehicle body, and object C close to the optical axis direction and object D in a direction of about 90 degrees from the optical axis direction are captured in one side camera image. However, the accuracy of positions at which images are captured in the camera image is not uniform. For example, a position of an image of object D shown in a peripheral portion (in the vicinity of the left end) of the side camera image is more inaccurate than a position of an image of object C shown in a center portion. Hereinafter, the reason of this inaccuracy will be described.

Figure 7:
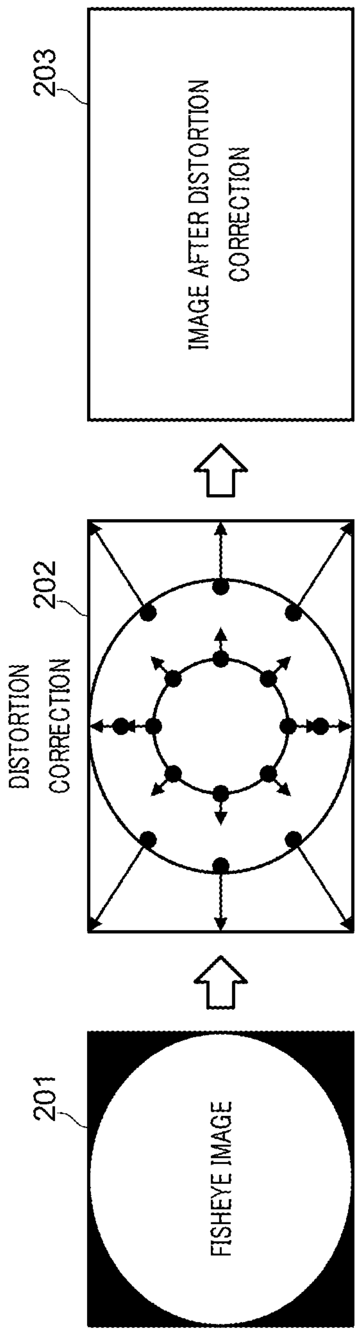
FIG. 7 illustrates an influence on the accuracy of an angle with respect to an optical axis direction of a camera.

FIG. 7 illustrates an influence on the accuracy of an angle of the camera with respect to the optical axis direction. A lens that captures light in a direction perpendicular to the optical axis direction is called a fisheye lens, and is configured to repeatedly bend the light by a large number of lenses such that the light is incident on the image sensor from a direction perpendicular to the optical axis direction. However, the way the image is captured in fisheye image 201 is significantly different between the central portion where an object close to the optical axis direction is captured on the image sensor and the peripheral portion where an object away from the optical axis direction is captured on the image sensor outside the central portion.

In the central portion of the sensor, the light that comes in the optical axis direction is weakly converged and is incident on the sensor surface at an angle close to perpendicular. On the other hand, in the peripheral portion of the sensor, the rays from an oblique direction to a direction perpendicular to the sensor surface are strongly converged and are obliquely incident on the sensor surface in a narrow range. For example, a distance over which the light spot moves on the sensor surface while an incidence angle of a thin ray varies from 90 degrees to 45 degrees is shorter than a distance over which the light spot moves on the sensor surface while the incidence angle varies from 45 degrees to 0 degrees. That is, since light on the outside of the 45-degree oblique line is converged to be incident on a narrow range on the sensor surface and is more strongly converged to the outside, the image of the subject is projected to be crushed toward a center, in the peripheral portion of fisheye image 201.

In addition, since the light includes wavelengths from red to blue and an angle at which the light is bent by the lens varies depending on the wavelength, the red ray and the blue ray are incident at different positions on the image sensor. This is called a chromatic aberration, and the influence of the chromatic aberration is large in a peripheral portion where the strongly bent ray is incident. That is, in the peripheral portion, a color shift occurs in which the position of the image captured varies depending on the color. In addition, a focal plane on which the image is focused on one point is a curved surface, not a plane, and is adjusted so that the focal plane is aligned with a center of the image sensor. Therefore, the image is out of focus at the peripheral portion and is blurred. In addition, since the image sensor has a three-dimensional structure, the light may be obliquely incident on the image sensor in the peripheral portion, which may also cause the blurring. In addition, the image captured at the peripheral portion is also blurred by being stretched in the next distortion correction. That is, due to various factors, the image captured in the peripheral portion is more blurred than the image captured in the center portion.

Since the lens bends the ray more strongly as the lens is located farther outward, a relationship between the azimuth of the subject and the position of the image of the subject is a non-linear function. Therefore, image processor 130 corrects the distortion of fisheye image 201 to stretch fisheye image 201 outward in accordance with an inverse function of the non-linear function to generate image after distortion correction 203. This is referred to as lens distortion correction 202. Specifically, image processor 130 creates image after distortion correction 203 by stretching fisheye image 201 in a direction moving away from an image center in accordance with an inverse function of a non-linear image height characteristic showing a relationship between the distance from a center and the size of the image.

The image height characteristic is represented by a graph with an image height on the vertical axis and angle θ on the horizontal axis. The image height is the distance between an image center and an image of the light incident at an angle of θ degrees to the optical axis when the position of the image of light incident on the optical axis is taken as the image center. The detection image may be an image obtained by performing image processing on image after distortion correction 203 or may be image after distortion correction 203 as it is. Since a distance (image height) from an image center of an image on the detection image is proportional to angle θ with respect to the optical axis, the position of the image on the detection image is converted into an azimuth of the subject in the self-position estimation.

However, in reality, the distortion remains to some extent in image after distortion correction 203 resulting from the distortion correction, and the image captured in the peripheral portion has a larger distortion than the image captured in the center portion. A cause of the remaining distortion is a problem of accuracy (variation) of a lens. The lens of an in-vehicle camera is configured by combining lenses manufactured by a cutting method, and the accuracy of the lens manufactured by the cutting method is lower than the accuracy of a lens manufactured by a polishing method. Therefore, the image height characteristic of the lens of the in-vehicle camera varies within the range of the shipment standard, and a range of the image height variation tends to be wider as the camera is lower in cost.

In addition, in the lens for the in-vehicle camera, since the lens is minimized and there is a constraint of cost, the optical axis alignment for adjusting the positions and the angles such that the optical axes of the lenses match each other when the plurality of lenses are superimposed is not performed. In a case where the optical axes of the lenses do not match each other, an unequal image height occurs in which the image height varies depending on the direction with respect to an image center. For example, in a case where a comparison is made between a distance from an image center of an image of a subject in a direction of 90 degrees to the right with respect to an optical axis and a distance from the image center of an image of a subject in a direction of 90 degrees to the left with respect to the optical axis, the distance from the image center is different between the left-right images.

In principle, as long as the image height characteristic is measured in a plurality of directions for each camera, is recorded for each camera, and is applied in each camera and each direction by changing the image height characteristic, the distortion can be corrected with high accuracy even in a case where the unequal image height or the variation in image height occurs. However, in reality, the individual image height characteristics are not measured due to a cost constraint, and the distortion is corrected using the same standard value of the image height characteristics in any camera and in any direction. That is, since the distortion correction does not correspond to the unequal image height or the variation in image height, the position of the image varies in the peripheral portion. In addition, the image height characteristic varies depending on the wavelength, but in the in-vehicle camera, any color component is subjected to distortion correction using the same standard value of the image height characteristic due to a cost constraint. That is, the chromatic aberration is not corrected in the distortion correction, the position of the image varies depending on the color of the subject in the peripheral portion.

That is, the position of the image is shifted by a difference between the image height characteristic of the lens and the standard value, and the position of the image is shifted depending on the color as well. Further, the blurring also makes the specification of the position unstable. For example, in a case where an image is blurred and the contour is gradational, the position of the digitized image may vary depending on a relationship with a threshold value of the detection. Since the blurring of the image or the shift of the position is large in the peripheral portion, it can be said that the position of the image captured in the peripheral portion is uncertain. Since the self-position estimation converts the position of the object on the image, specifically, the position of the object on the image after correction in the left-right direction of the image into the azimuth of the object, it may be said that the azimuth of the object captured in the peripheral portion is less accurate than the azimuth of the object captured in the center portion.

From the above, it can be said that it is advantageous in terms of accuracy to preferentially register a feature point in the optical axis direction of the camera on the map. Therefore, when selecting feature points, the feature point selector that selects a feature point to be registered on the map evaluates a feature point based on an angle of the feature point with respect to the optical axis of the predetermined camera, and preferentially registers, on the map, a feature point having a smaller angle with respect to the optical axis of the camera than a feature point having a larger angle with respect to the optical axis of the camera.

Figure 8:
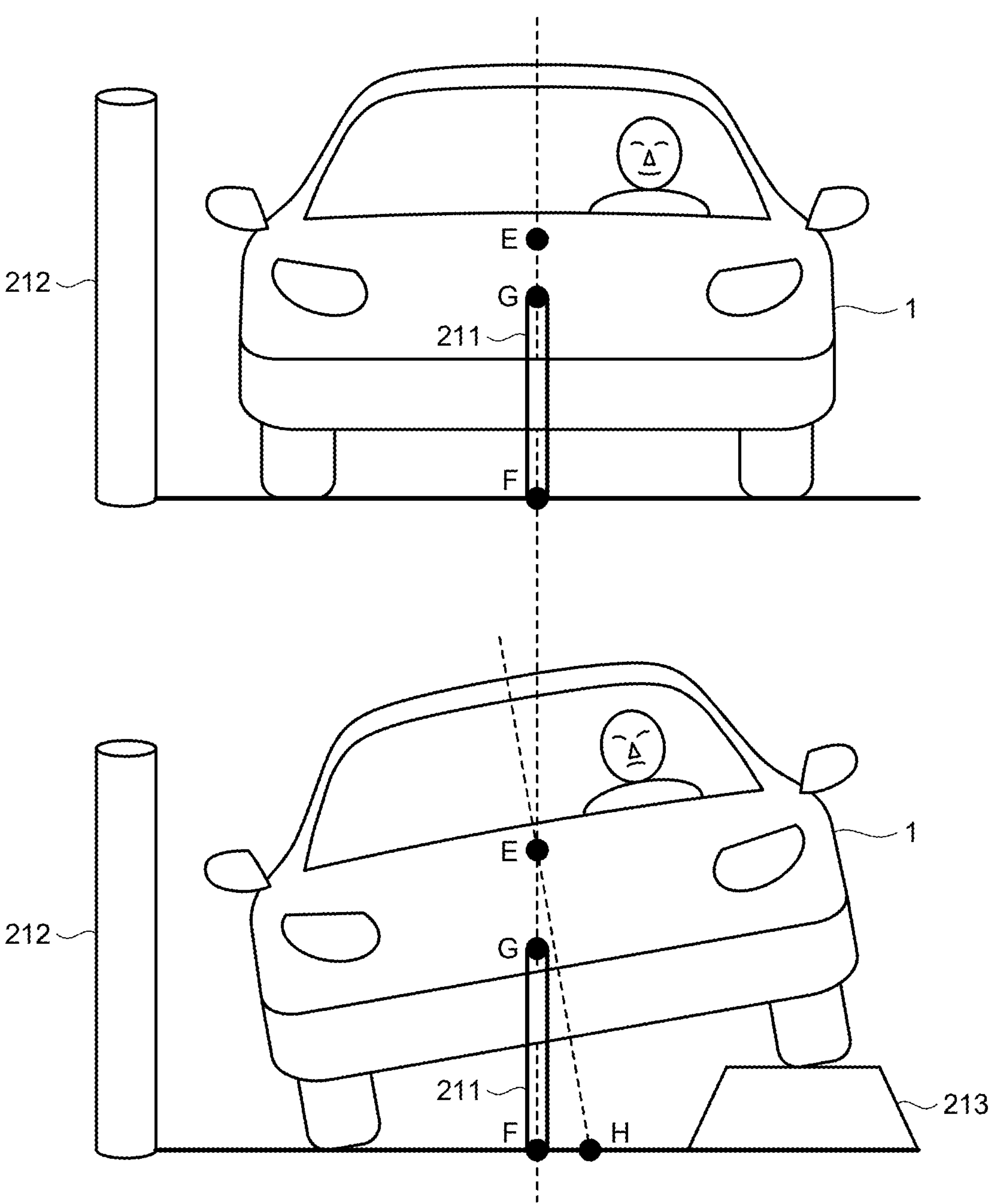
FIG. 8 illustrates an influence on the accuracy of a difference in height between a camera and a feature point.

Next, an influence on the accuracy of a difference in height between the camera and a feature point will be described. FIG. 8 illustrates an influence on the accuracy of the difference in height between the camera and feature points. The upper drawing and the lower drawing are diagrams of the vehicle viewed from the front, in which the upper drawing is a diagram during the learning travel and the vehicle is upright. The lower drawing is a diagram during automatic parking, in which the vehicle body is tilted in a roll direction by a side tire riding on convex portion 213 on the road surface. Convex portion 213 may be, for example, a raised portion of snow or soil, or may be assumed to be a situation where the other wheel falls into a rut.

Point E represents a position of a front camera that captures an image of in a forward direction of vehicle 1. Pole 211 is present directly in front of the vehicle, and point F represents a position of a feature point on a root of pole 211, and point G represents a position of a feature point on a tip of pole 211. In addition, electric pole 212 is located on a right side of the vehicle body as viewed from the driver.

Position estimator 150 converts the positions of the feature points on the camera image, specifically, converts the positions of the feature points on the image in the left-right direction into azimuths of objects. In the case of the upper drawing, since both feature points F and G are captured in a center of the image, the specified azimuths are the same. In the case of the lower drawing, feature points F and G are in front of the camera, but point H on the road surface is captured in a center of the camera image, and both feature points F and G are captured on the right side relative to the center of the image. Both the displacement of feature point F and the displacement of feature point G are caused by the inclination of the vehicle body, but feature point F having a large difference in height from the camera has a larger displacement amount due to the inclination of the vehicle body than feature point G having a small difference in height from the camera has.

In a case where feature point F is registered on the map in a state of the upper drawing during the learning travel, and the self-position is estimated in a state of the lower drawing during the automatic parking, feature point F is captured to be located on the right side relative to the center of the image. Therefore, even though pole 211 is located in front of the camera, it is estimated that the vehicle body is shifted to the left (right in the drawing) in the traveling direction, and the steering angle is corrected to the right such that feature point F is captured to be located at a center of the camera image. Then, the course of vehicle 1 is changed, and vehicle 1 approaches electric pole 212 on the right side. In this way, an error in the self-position estimation may occur due to the influence of the roll of the vehicle body, which may cause incorrect steering angle correction.

Here, a case where feature point G having a small difference in height is registered on the map instead of feature point F having a large difference in height from the camera will be considered. Then, since the displacement amount of feature point G due to the inclination of the vehicle body is smaller than the displacement amount of feature point F, it can be expected that the change amount in the steering angle due to the error in the estimation of the own position is also small. That is, it is advantageous in terms of accuracy to register feature point G having a small difference in height from the camera. Therefore, when selecting feature points, the feature point selector that selects a feature point to be registered on the map evaluates a feature point based on the difference in height between a predetermined camera and the feature point, and preferentially registers, on the map, a feature point having a smaller difference in height from the camera than a feature point having a larger difference in height from the camera.

Above, the conditions of a feature point that is advantageous in terms of the accuracy in the position estimation has been described based on the difference in height in between with the camera and the positional relationship in between with the optical axis direction, but since the position and the optical axis direction of the camera vary due to movement of vehicle 1, the position of the feature point that contributes to the accuracy is not specified unless the position on the route is specified. That is, it is necessary to specify the position on the route and to select a feature point that is advantageous in terms of accuracy at the position.

In addition, it is preferable that the priority for registration or the number of feature points to be registered is different depending on the position on the route. Therefore, the feature point selector may repeat the following step of: specifying a predetermined point on a parking route or a predetermined section of the parking route; setting a priority for registration of a feature point or the number of feature points to be registered in accordance with a position on the specified parking route; and, in the position on the specified parking route, evaluating the feature points based on the position of the camera or a relative position with respect to an optical axis direction of the camera and preferentially registering a feature point advantageous in accuracy at the position, for each position on the parking route.

Alternatively, processing of evaluating the parking route in a bird's-eye view and setting, for each position on the route, the priority for registration or the number of feature points to be registered may be performed first, and processing of selecting a feature point to be registered on the map based on the position on the parking route of the camera or the relative position with respect to the optical axis direction of the camera at the position on the parking route may be performed. Alternatively, the effect may be obtained by any one of processing of making the priority for registration of the feature point or the number of feature points to be registered to be different in accordance with the position on the parking route and processing of selecting a feature point to be registered on the map based on the position of the camera or the relative position of the feature point with respect to the optical axis direction of the camera at the position on the parking route.

In addition, since there are a direction requiring accuracy and a direction not requiring accuracy, depending on the position on the route, the camera that should capture a feature point contributing to the accuracy is different. Therefore, in a case where a position on the route is specified and a feature point is evaluated based on a position of a camera or a relative position with respect to the optical axis direction of the camera, a camera to be used as the evaluation reference at the position may be specified, and a feature point that contributes to the accuracy may be selected based on the position or the optical axis direction of the specified camera. For example, in a position where the accuracy in the front-rear direction is not required but the accuracy in the left-right direction is required, the feature points captured in the optical axis direction of the front-rear cameras are registered in advance, and the number of feature points registered near the front-rear cameras is increased. In this case, the registration of the feature points captured by the left-right cameras may be postponed or the number of feature points to be registered may be reduced.

Alternatively, the number of feature points to be registered may be increased by giving a high point assignment to positions where high accuracy is required, and the number of feature points may be reduced by giving a low point assignment to positions where accuracy requirements are lower. Alternatively, the stage of evaluating feature points and the stage of selecting feature points may be clearly separated from each other, and the feature points may be selected after all the evaluation is finished. For example, after performing, at all positions, an evaluation step of evaluating feature points at a certain position and giving a high evaluation point to the feature point at a position advantageous for obtaining the accuracy, the feature points may be selected in descending order of the evaluation point. Also in this case, the same effect can be expected by specifying the camera that contributes to the accuracy at the position where the accuracy is required and giving a high evaluation point to a feature point that contributes to the accuracy.

Hereinafter, in the self-position estimation for the automatic parking, the information to be specified and the matters to be considered will be organized. The information to be specified in the self-position estimation for the automatic parking is the position of the vehicle in the front-rear direction, the position of the vehicle in the left-right direction, and the orientation (posture) of the vehicle. In a case where this information is applied to the route of automatic parking, the front-rear direction of vehicle 1 corresponds to a tangent direction of the parking route, the left-right direction of vehicle 1 corresponds to a normal direction of the parking route, and the orientation (posture) of vehicle 1 corresponds to an inclination of the tangent line or the normal line of the parking route. In the automatic parking, the steering is performed in accordance with the position of the vehicle in the left-right direction, and the vehicle speed is controlled or the gear is switched in accordance with the position of the vehicle in the front-rear direction.

Since a feature point contributes to the position estimation by being captured by a camera, the optical axis direction of the camera is a reference for evaluating the contribution of the feature point to the position estimation. The tangent direction of the parking route corresponds to the optical axis direction of front-rear cameras 2 of vehicle 1, and the normal direction of the parking route corresponds to the optical axis direction of left-right cameras **2*a* of vehicle 1**.

The parking route can be divided into sections such as a straight line section and a curved line section, and the direction in which the estimation accuracy is required and the degree to which the estimation accuracy is required are different depending on the properties of the sections. The estimated position is obtained by applying an azimuth of a feature point to the triangulation, but the accuracy is improved in some cases and the accuracy is not improved in some cases depending on the positional relationship between the section and the feature point. Here, the feature point that highly contributes to the accuracy is referred to as a "feature point having high sensitivity," and the feature point that contributes less to the accuracy is referred to as a "feature point having low sensitivity."

Figure 9:
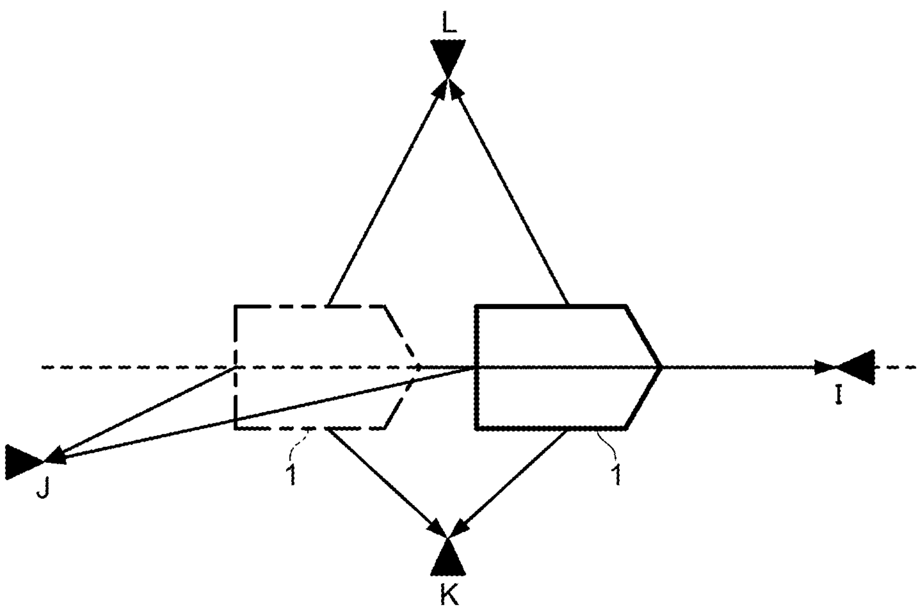
FIG. 9 illustrates a position of a feature point and a sensitivity in a front-rear and left-right direction of the vehicle.

Hereinafter, a relationship between a position of a feature point and the accuracy obtained by the position of the feature point will be organized. FIG. 9 illustrates the positions of feature points and a sensitivity in the front-rear and left-right direction of vehicle 1. It is considered that there are feature points IJKL in front and rear and left and right of vehicle 1, and the movement of vehicle 1 is detected based on a change in azimuth (motion parallax) of the feature points in a case where vehicle 1 moves forward. The azimuths of the feature points are each a vehicle-based azimuth with respect to vehicle 1 in which a front surface in a front direction is set to 0 degrees. Front-rear/left-right cameras 2 of vehicle 1 capture images of the feature points, and the azimuths of the feature points are each detected as a position in a left-right direction on the camera images. For example, feature point I is at 0 degrees, and the azimuth of the feature point does not change even in a case where vehicle 1 moves forward. That is, the motion parallax of feature point I is zero. Since, in the self-position estimation, a movement amount is estimated based on the motion parallax, the movement amount cannot be estimated at feature point I. This may be paraphrased as feature point I has no sensitivity to the movement in the front-rear direction.

Since the azimuth of feature point J behind vehicle 1 varies in accordance with movement of vehicle 1 in the front-rear direction, feature point J has sensitivity to the movement in the front-rear direction. Feature points KL on the left and right sides of vehicle 1 exhibit large changes in azimuth with respect to movement of vehicle 1 in the front-rear direction. Therefore, it can be said that these feature points KL have a higher sensitivity compared to feature points I and J located in the front-rear direction of vehicle 1.

In a case where the sensitivity of feature point K and feature point L are compared with each other, feature point K located near feature point L has a larger change amount in azimuth than feature point L located far away, and thus has higher sensitivity. In general, it can be said that a close feature point has higher sensitivity because it has a larger motion parallax than the motion parallax of a distant feature point.

Therefore, in a scene where the detection accuracy of the position in the front-rear direction is required, map generator 120 may select the feature points located in the left-right direction, and may further preferentially select a feature point located closer than a feature point located far in the left-right direction, among the feature points located in left-right direction.

Figure 10:
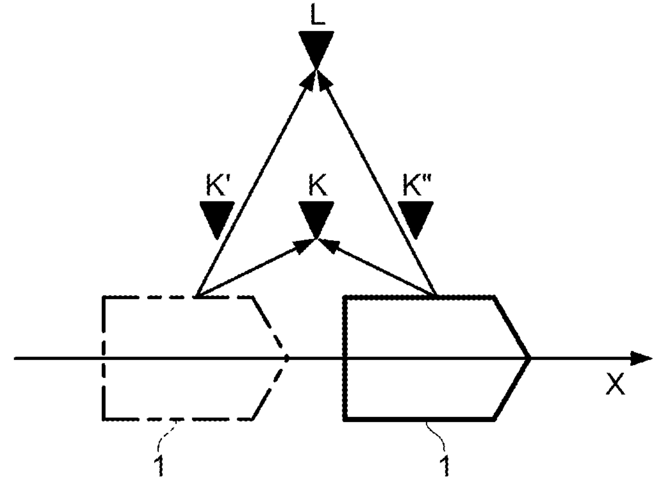
FIG. 10 illustrates a relationship between a distance from a course of the vehicle to a feature point and sensitivity.
Figure 11:
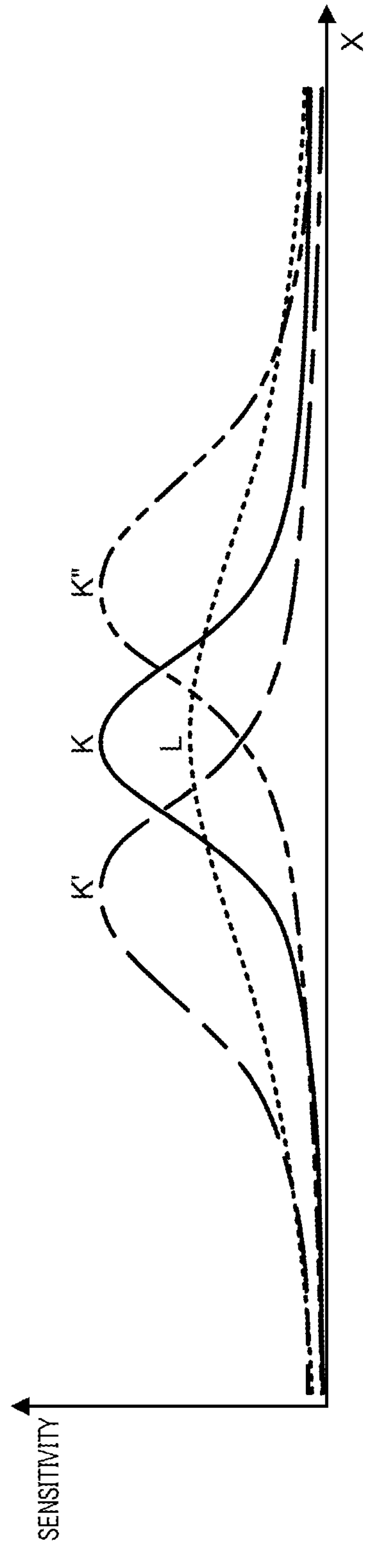
FIG. 11 illustrates a change in sensitivity of a feature point.

FIG. 10 illustrates a relationship between a distance from the course of vehicle 1 to a feature point and sensitivity. FIG. 11 illustrates a change in sensitivity of a feature point in a case where vehicle 1 moves. The sensitivity of the vertical axis may be read as the movement parallax. FIG. 11 corresponds to FIG. 10 and is a graph showing a change in sensitivity of each feature point in a case where vehicle 1 passes through the side of the feature point shown in FIG. 10. For example, in a case where vehicle 1 passes through just beside feature points K and L, the sensitivity (movement parallax) between feature points K and L is maximized. In this case, the sensitivity of feature point K is larger than the sensitivity of feature point L, but the sensitivity of feature point K is decreased as vehicle 1 is distanced, and the sensitivity thereof is lower than the sensitivity of feature point L. That is, the closer the feature point is to the route of vehicle 1, the narrower the high sensitivity range is.

In a case where vehicle 1 requires the position accuracy in the front-rear direction not only just beside feature point K but also in front of and behind K, feature points K' and K" front and behind feature point K may be registered. That is, in a case where the high sensitivity range is narrow, the number of feature points may be increased to compensate for the narrow high sensitivity range. For example, in a case of setting an interval threshold value that restricts an interval between the selected feature points in order to avoid the unevenness of the feature points to be registered on the map, a section that requires accuracy in the front-rear direction may be set to have a smaller interval threshold value to make the interval between the selected feature points smaller. That is, in a case where a section requiring accuracy during learning travel is specified and a large number of the feature points close to a route of the section are densely registered, it is possible to obtain the accuracy required in the section requiring accuracy during automatic parking.

Alternatively, map generator 120 may register both feature point K close to the route and feature point L away from the route on the map, and may maintain the required accuracy by using feature point L in a case where vehicle 1 is distanced from feature point K. Alternatively, in a section where a low accuracy in the front-rear direction is acceptable, only feature point L away from the route of vehicle 1 may be selected to maintain the required accuracy with a small number of the feature points. Since the sensitivity (motion parallax) of the feature point is smaller as the distance increases, even in a case where a feature point having a long distance is selected, for example, a feature point having a distance of 10 meters or more may be excluded from the selection.

The position at which the accuracy is maintained with a small number of the feature points may be referred to as a position with a low priority and a small number of points to be registered. Since it is better to register the feature points close to each other at a position where the priority is high and the number of feature points to be registered is large, it is preferable to change the distance of the prioritized feature point depending on the position on the parking route. That is, the feature point selector evaluates the feature points based on a distance between the position on the parking route and each feature point, and registers a feature point at which the distance is long on the map in a case where the position on the parking route is a position at which the priority for registration of the feature point is low or a position at which the number of feature points to be registered is small with priority over in a case where the position on the parking route is a position at which the priority for registration of the feature point is high or a position at which the number of feature points to be registered is large. For example, since the number of registration points is reduced at a position where the accuracy in the front-rear direction is not required, the feature points that are away from the route by about five meters are preferentially registered among the feature points captured by the left-right cameras, and the feature points that are away from the route by less than two meters are not registered.

Figure 12:
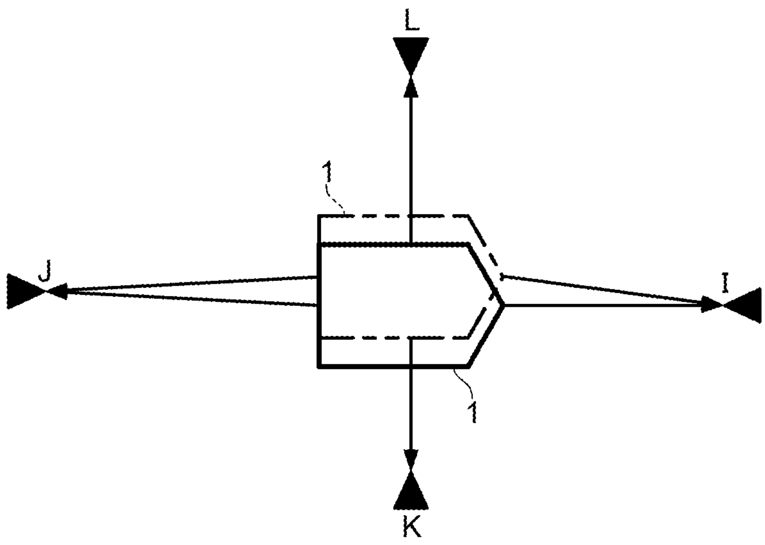
FIG. 12 illustrates a position of a feature point and sensitivity in the left-right direction.

FIG. 12 illustrates positions of feature points and the sensitivity in the left-right direction. In a case where the position of vehicle 1 is changed in the left-right direction, the azimuths of front and rear feature points I and J are changed, whereas the azimuths of the left and right feature points KL are not changed. That is, for the position in the left-right direction, since feature points I and J in the front and rear have a larger motion parallax than feature points K and L in the left and right, it can be said that the sensitivity of feature points I and J is higher. Therefore, in a scene where the detection accuracy of the position in the left-right direction is required, map generator 120 may preferentially select the feature point having a small angle with respect to the front-rear direction of the vehicle.

Figure 13:
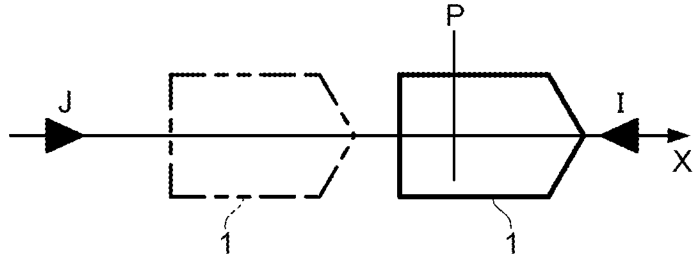
FIG. 13 illustrates a case where a feature point is present on a course of the vehicle.
Figure 14:
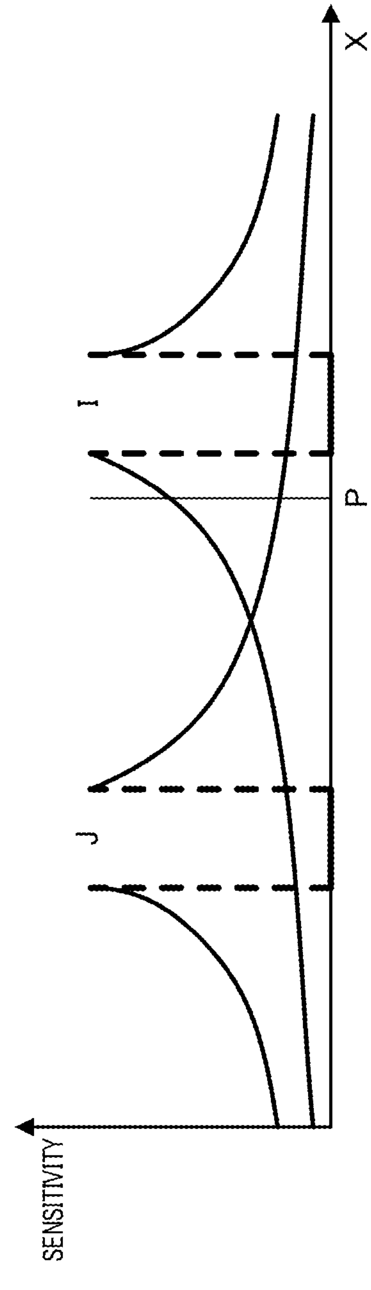
FIG. 14 illustrates a change in sensitivity of a feature point in a case where the vehicle is moved in an X direction.

FIG. 13 illustrates a case where a feature point is present on the course of the vehicle. FIG. 14 illustrates a change in sensitivity of a feature point in a case where the vehicle moves in the X direction. FIG. 14 corresponds to FIG. 13, and as shown in FIG. 13, represents the time change of the sensitivity in the left-right direction of each of feature point I and feature point J in a case where vehicle 1 passes from the left to the right. Here, it is assumed that feature point I and feature point J are on the road surface, and vehicle 1 passes over the feature points. The fact that the sensitivity of the close feature point is higher than that of the distant feature point is the same for the sensitivity in the left-right direction as it is for the position change in the front-rear direction. However, as shown in FIG. 13, in a case where a feature point is located below vehicle 1, the feature point enters a blind spot of camera 2 and thus cannot be detected, and the sensitivity is zero.

That is, the sensitivity is high in the close feature point, but the sensitivity is lost in a case where the feature point is in a blind spot. Therefore, among the feature points that can be detected at a position (for example, the parking position P) requiring the accuracy in the left-right direction, the feature point closest to the front camera may be selected.

Figure 15:
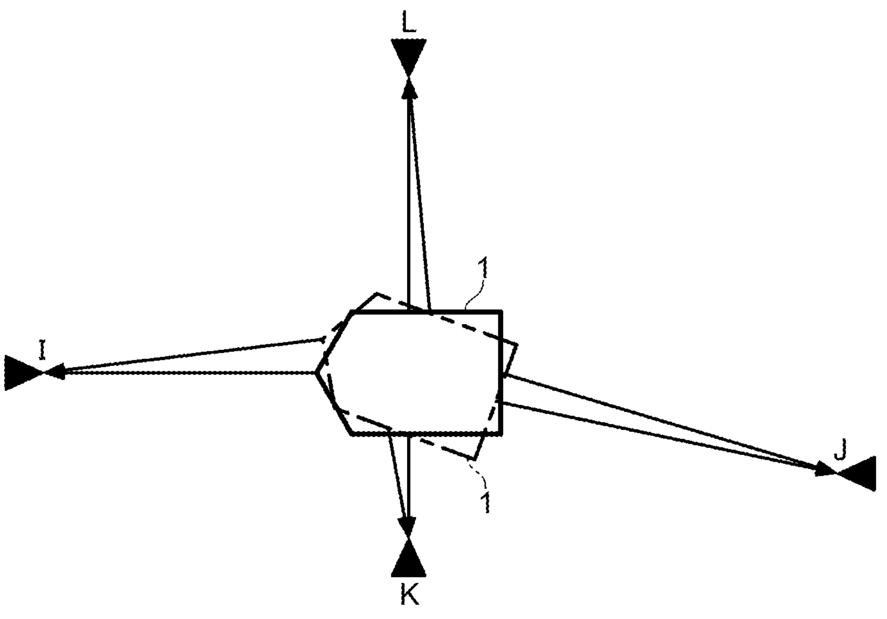
FIG. 15 illustrates a position of a feature point and a sensitivity of a vehicle posture.

FIG. 15 illustrates the positions of the feature points and the sensitivity of the vehicle posture. In a case where the orientation of vehicle 1 is changed, all of front-rear-left-right feature points I, J, K, and L have a change in azimuth, so that there is no difference in sensitivity depending on the azimuth. The fact that the sensitivity of the close feature point is higher than that of the distant feature point is the same as it is for the sensitivity in the left-right direction and in the front-rear direction. Therefore, map generator 120 may preferentially select a close feature point over a distant feature point in a scene requiring the detection accuracy of the orientation of the vehicle.

Figure 16:
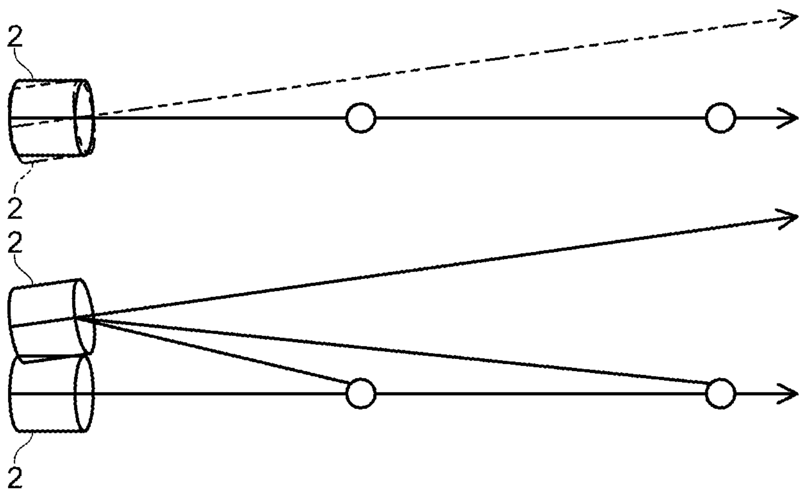
FIG. 16 illustrates a state where an orientation or a position of a camera is changed.

The difference in sensitivity of the feature points depending on the distance in a case where the orientation of vehicle 1 is changed is caused by motion parallax due to a change in position of camera 2 when the orientation of vehicle 1 is changed, and is a secondary effect. FIG. 16 illustrates a state where an orientation or a position of camera 2 is changed.

For example, as shown in the upper drawing, in a case where the position of camera 2 is the same and only the orientation of cameras 2 is different, an image of an close object and an image of a distant object move by the same amount on the screen. That is, in a case where only the orientation of camera 2 is changed, there is no motion parallax, so that there is no difference in sensitivity due to the distance of the feature points. As shown in the lower drawing, in a case where the position of camera 2 is also changed at the same time the orientation of camera 2 is changed due to a change in orientation of vehicle 1, the image of the close object is moved more than the image of the distant object by the motion parallax.

That is, FIG. 16 shows that the image of the distant object moves to be the same as or smaller than the image of the close object. PTL 2 states that "the farther the object is from the vehicle, the more the object is moved and displayed with respect to the change in the posture," which is the opposite of the event shown in the drawing, but it is considered that this is a misunderstanding of the secondary effect due to the motion parallax.

Figure 17:
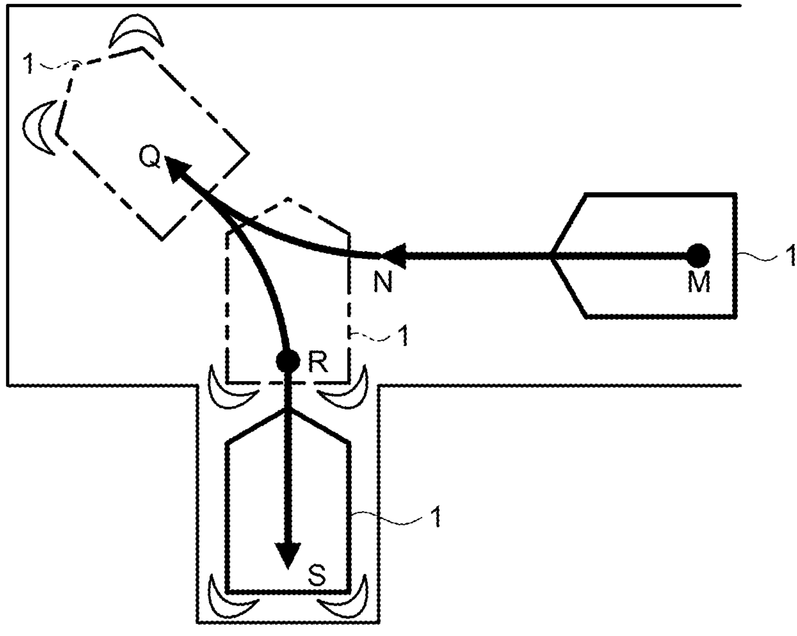
FIG. 17 illustrates a position of a vehicle that requires the accuracy in self-position estimation.

Next, a position of vehicle 1 that requires the accuracy in the self-position estimation will be described. FIG. 17 illustrates a position of vehicle 1 that requires the accuracy in the self-position estimation. The letter M is a parking start position, N is a turning start position, Q is a cut-back position, R is a turning end position, and S is a parking position, and when a parking route is divided into a straight line section and a curved line section, all of M to S are terminal points (start points or end points) of the sections. Since the traveling direction (gear position) of the vehicle does not change in points N and R among the terminal points, points N and R are each referred to as a passing point. Since the vehicle stops at points M, Q, and S, points M, Q, and S are each referred to as a stop point.

At the stop point, the steering angle is changed, the traveling direction is changed, or the vehicle is stopped, and thus, in a case where the position accuracy in the front-rear direction at a terminal point is poor, the vehicle deviates from the parking route or the parking position is shifted. Therefore, the position accuracy in the front-rear direction is required at a terminal point. In addition, in a case where the position in the left-right direction is shifted at the parking position S or the cut-back position Q, the vehicle may approach an obstacle; hence, the position accuracy in the left-right direction is required at the stop point. That is, at the stop point, the position accuracy in the front-rear direction and the left-right direction is required.

Among passing points N and R, since there is no obstacle in the left-right direction at point N, the position accuracy in the left-right direction may be low. However, since point R is a point where the vehicle starts to travel straight toward the parking position and left-right alignment is performed here, the position accuracy in the left-right direction is also required. At a position where the position accuracy is required, a feature point close to the camera or the optical axis direction may be selected with the position and the optical axis direction of camera 2 as a reference. In addition, since the left-right alignment starts from the position before R, the position accuracy in the left-right direction is required even at the position before R.

Figure 18:
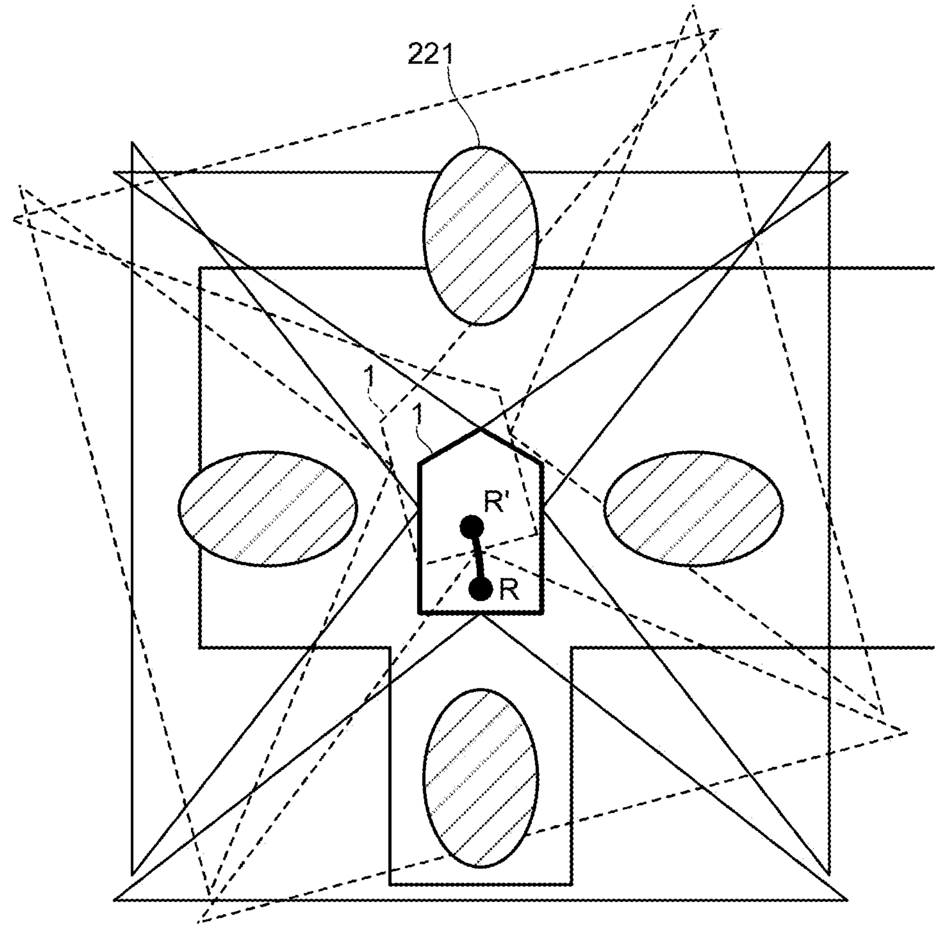
FIG. 18 illustrates arrangement of feature points around a terminal point.
Figure 19:
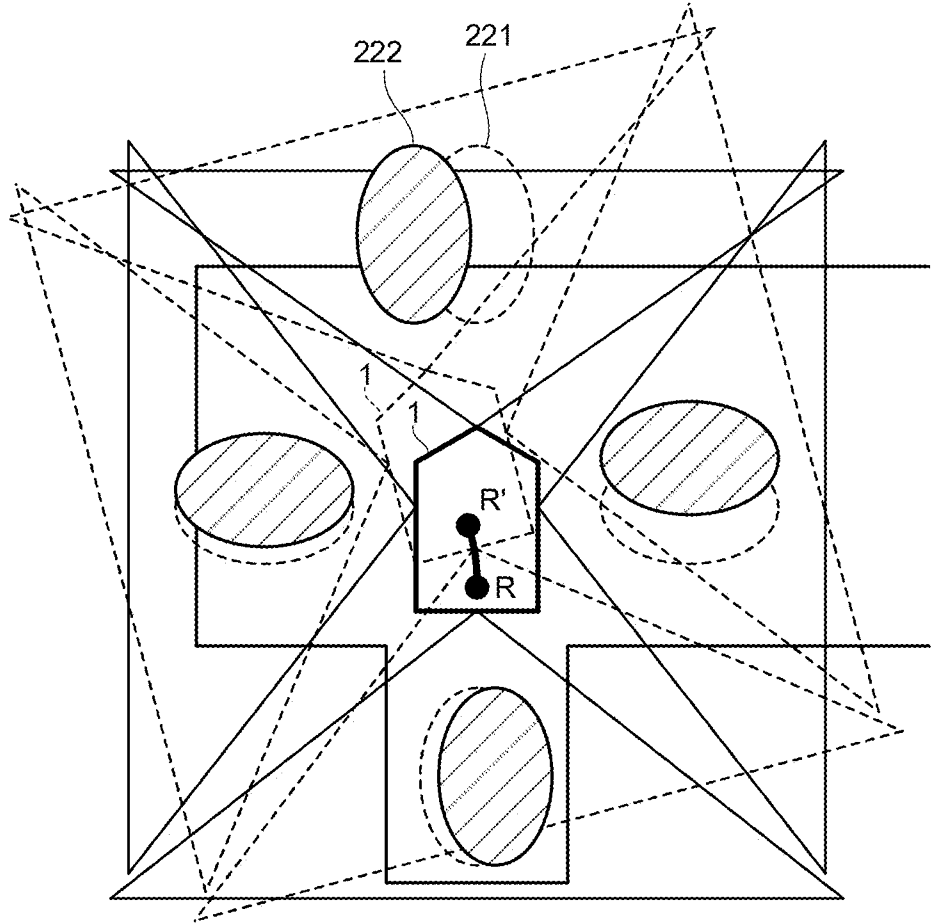
FIG. 19 illustrates other arrangement of feature points around the terminal point.

FIGS. 18 and 19 are each a diagram showing the arrangement of feature points around the terminal points. In a case where the left and right positions at the position of R in FIG. 17 need to be accurate, for example, as shown in FIG. 18, the alignment may be started from point R' before R. In this case, it is sufficient that the feature points are arranged such that the position accuracy can be obtained between R' and R.

Here, as shown in FIG. 18, map generator 120 may arrange feature points in ranges 221 located in the optical axis direction of front-rear/left-right cameras 2 of vehicle 1 when vehicle 1 is at the position R. In this way, it is expected that the feature points in same ranges 221 can be captured in the directions close to the optical axes of front-rear/left-right cameras 2 even at the position of point R' in front of point R. That is, in a case where the feature point are arranged around the terminal points, the position accuracy can be sufficiently obtained even before the terminal points.

In addition, as shown in FIG. 19, the range of the feature points to be registered may be adjusted so that the feature points are easily captured even before the terminal points. Ranges 222 in FIG. 19 which are obtained by adjusting by shifting the positions of ranges 221 at the position of point R' before point R to the left to correspond to the head of vehicle 1 being positioned towards the left, and in which the positions of the feature points are adjusted to be located substantially in front of cameras 2 of vehicle 1 at both points R and R'. The feature points arranged around the terminal points including before the terminal points are referred to as feature points of the terminal points.

A portion segmented by one set of terminal points in the automatic parking route is referred to as a section. The section is divided into a straight line section that extends straight and a curved line section that turns at a constant steering angle, based on the shape of the section. For example, MN and RS shown in FIG. 17 are straight line sections, and NQ and QR are curved line sections.

Geometrically, the section includes terminal points. However, in the processing for feature points, the feature points of the terminal points (the feature points arranged around the terminal points) and feature points of the section are handled separately, and the feature points of the section do not include the feature points of the terminal points. This is because the feature points of the terminal points need to be preferentially handled. Specifically, in a case of focusing on one section, first, the feature points are arranged around the terminal points, and then, the feature points are arranged around the section as necessary. In a case where the vehicle is present near a terminal point, since the position accuracy can be obtained by the feature points arranged around the terminal point, the feature points are used as the feature points of the section in a case where the position accuracy is required at an intermediate portion between the terminal points. That is, the feature points of the section may be handled as an auxiliary, and may not be registered in a case where there is no necessity.

Since a position in the front-rear direction (the direction along the section in a case of a straight line section and the tangent direction in a case of a curved line section) in the section need only be determined in a case where the position is close to the terminal points, the position accuracy in the front-rear direction is not required in an intermediate portion between the terminal points. That is, in the section, it is sufficient to obtain the position accuracy in the left-right direction (a direction orthogonal to the section in a case of a straight line section, and a normal direction in a case of a curved line section). In the section, the position accuracy is obtained not only by the feature points arranged as the feature points of the section but also by using all the detected feature points. That is, in order to obtain the position accuracy in the left-right direction in the section, the feature points of the terminal points can be used, so that the feature point may be supplemented at a position where the accuracy in the middle of the section is insufficient.

Figure 20:
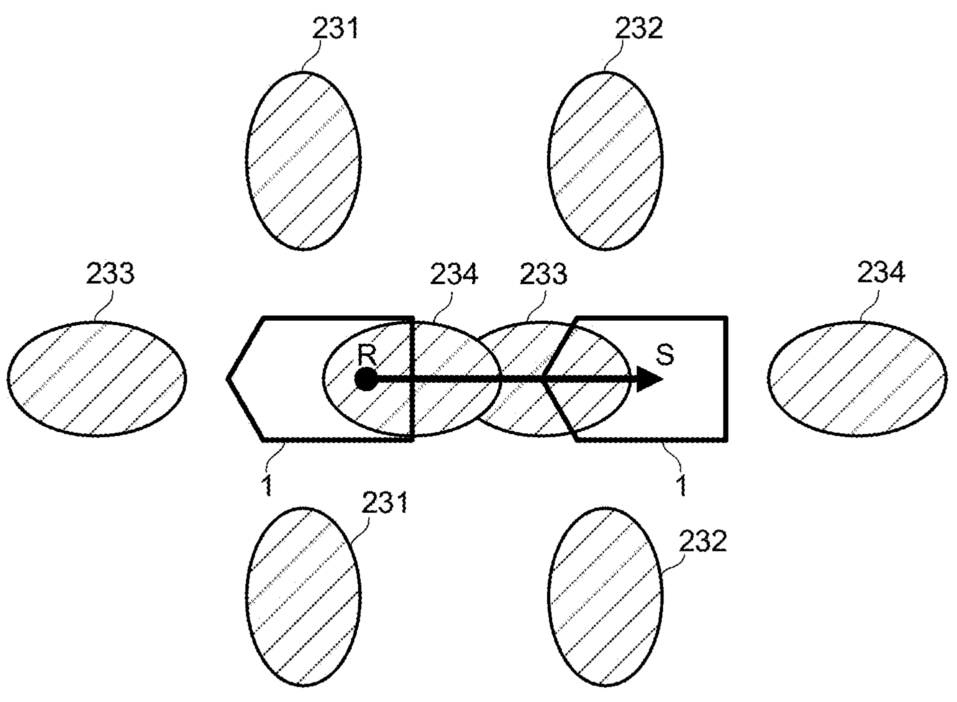
FIG. 20 illustrates feature points around a straight line section.

FIG. 20 illustrates ellipses indicating ranges of the feature points of the terminal points arranged around terminal point R and terminal point S in straight line section RS in which the vehicle moves backward from point R to point S. For example, in the straight line section from R to S, there are range 231 of feature points arranged on the left and right of the vehicle at the position of R and range 233 of feature points arranged at the front and the rear of the vehicle at the position of R, and there are range 232 of feature points arranged on the left and right of the position of the vehicle at the position of S and range 234 of feature points arranged at the front and the rear of the vehicle at the position of S. In a case where the vehicle is located near the middle point between terminal point R and terminal point S, a feature point in the blind spot below the vehicle cannot be detected, but all the other detection points can be detected, and since the feature points in ranges of 233 and 234 at the front and the rear of vehicle 1 are in the optical axis direction of the cameras in the front-rear direction, sufficient accuracy can be obtained in the position estimation in the left-right direction. Therefore, for example, in a case where the section is a short straight line section as in FIG. 20, there need not be feature points to be registered as the feature points of the section.

In this way, in a case where the feature points of the terminal points to be registered at the terminal points are registered with priority, the number of feature points to be registered as the feature points of the section is reduced, and more than half of the feature points to be registered are the feature points of the terminal points. In addition, the feature points of the terminal points may be preferentially registered by distributing (assigning) the feature points of the terminal points to be more than the feature points of the section. In other words, the feature point selector may register feature points in accordance with the position on the parking route and may register the feature points to be registered at the terminal points with priority over the feature points to be registered in the section, or may register more feature points to be registered at the terminal points than the feature points to be registered in the section.

In addition, each section may be divided into a portion before the end and the other portion, and the portion before the end may be referred to as an end portion, and the other portion may be referred to as an on-the-way portion. In a case of the registration processing of feature points, the end portion may be preferentially handled as the end. The end is a terminal point having a shorter route length to the parking position among the terminal points of the section, and the route length to the parking position is a distance from the terminal point to the parking position along the parking route.

This supports a case where it is difficult to correct the deviation from the route even if it is found to be out of the route near a terminal point. For example, even if it is found that the vehicle has deviated 20 cm sideways at a position 1 m ahead of the parking position, it is difficult to correct this deviation; however, if such a deviation is detected at a position 2 m ahead of the parking position, correction is possible. That is, since it is too late if the deviation is detected at the end, it is necessary to perform an accurate position estimation from a point before the end where the deviation can be corrected.

Therefore, the feature point selector evaluates a route length between the position on the parking route and the parking position, and registers feature points to be registered at a position at which the route length is short with priority over feature points to be registered at a position at which the route length is long, or registers more feature points at the position at which the route length is short than at the position at which the route length is long. For example, even in one section, feature points to be registered at the end portion may be registered with priority over feature points to be registered at the on-the-way portion, and more feature points may be registered at the end portion than the feature points registered at the on-the-way portion.

The difference from the former, which prioritizes only the terminal points, is that the range in which the feature points are preferentially arranged is expanded to a portion (end portion) before the terminal points in order to obtain accuracy. However, as described above, in a case where a large number of feature points are arranged around the terminal points, sufficient accuracy can be obtained even in the end portion: hence, there may be no substantial difference. In the present embodiment, the terminal point and the end portion are distinguished from each other in order to describe the background of the required accuracy at the terminal point and the end portion. However, in a case where the feature points are arranged giving priority to the terminal points and the feature points in the section giving priority to a portion close to the end point, it is expected that the same effect in a case of giving priority to the end portion is obtained, and thus, either one may be used in practice.

Figure 21:
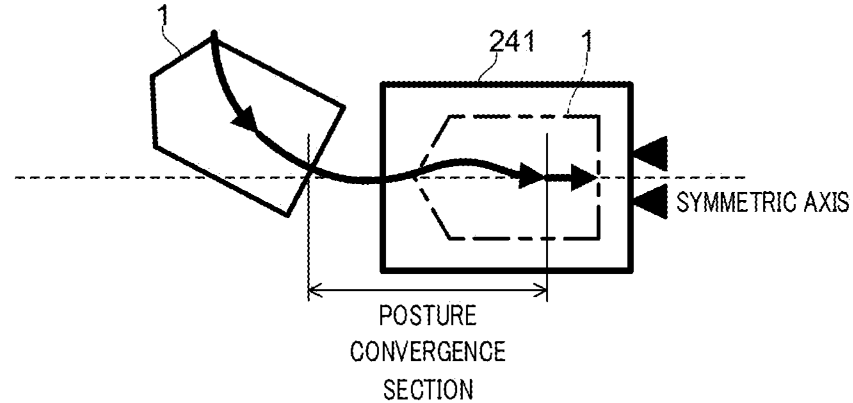
FIG. 21 illustrates a posture convergence section in which an occupant performs alignment in the left-right direction by steering.
Figure 22:
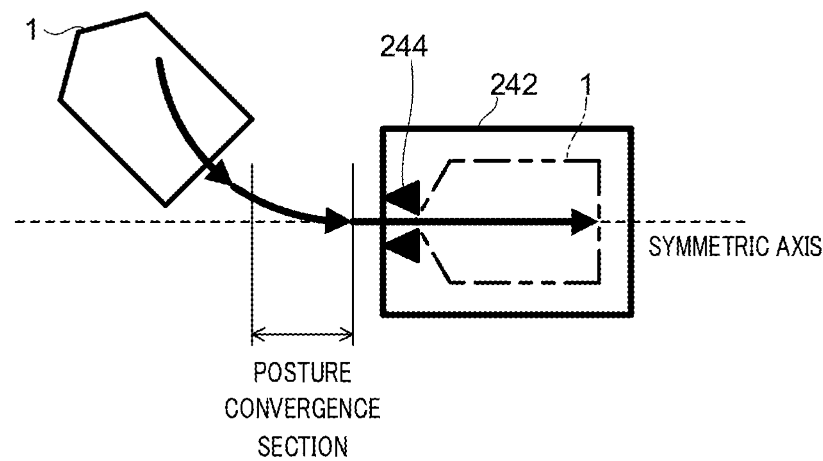
FIG. 22 illustrates another posture convergence section in which the occupant performs alignment in the left-right direction by steering.

FIGS. 21 and 22 are each a diagram showing a posture convergence section in which an occupant performs alignment in the left-right direction (left-right alignment) by steering before the parking position. In general, since the front wheels of vehicle 1 are steering wheels and the axle of the rear wheels is fixed and does not rotate in the left-right direction, the vehicle is likely to move freely in the front-rear direction, but is unlikely to move in the left-right direction, and the rear portion of vehicle 1 is particularly unlikely to move in the left-right direction. Since vehicle 1 has such characteristics, parking is often performed by steering the vehicle before the parking position to align the position in the left-right direction first, and the vehicle is then stopped by aligning the position in the front-rear direction to the parking position.

That is, the last section of the parking route is a straight line section ending at the parking position, and there is a section for which the left-right alignment is performed by steering before the last section. While the left and right alignment is performed, the posture (orientation) of the vehicle is changed, but after the left-right alignment is finished, the steering angle is returned to the neutral position, and the change in posture converges; hence, this section is referred to as a posture convergence section. A position of the posture convergence section depends on a state of parking space 241. For example, in a case where parking space 241 is a parking frame drawn on the road surface and there is no three-dimensional object or the like around parking space 241, the alignment can be performed in parking space 241.

Therefore, as shown in FIG. 21, the posture convergence section may continue from the outside of the parking frame to the inside of the parking frame, and the length of the last straight line section may be equal to or less than one vehicle length. However, as shown in FIG. 22, in a case where the vehicle is parked on pallet 242 of a mechanical parking garage, the vehicle can only go straight on pallet 242; hence, it is necessary to complete the left-right alignment before pallet 242. Therefore, the posture convergence section ends before pallet 242, and the length of the last straight line section becomes equal to or greater than one vehicle length.

Since parking space 241 is often set substantially perpendicularly to a road or a passage facing parking space 241, parking space 241 often has a curved line section for changing the orientation of the vehicle body before the straight line section. Therefore, in a case where the steering angle is returned to the neutral position at the end of the curved line section, the left-right alignment is often performed by adding or subtracting the speed of returning the steering angle. In this case, as shown in FIG. 22, a portion at the end of the last curved line section, in other words, an end portion of the last curved line section is the posture convergence section.

Therefore, a section in which a posture angle of vehicle 1 varies and a difference between the posture angle and a posture angle of the vehicle at the parking position is equal to or smaller than a predetermined angle threshold value is set as a posture convergence section, and the position accuracy in the left-right direction is improved in the posture convergence section. For example, in a case where the parking route ends at a straight line section and a curved line section is present before the straight line section, the posture convergence section in which the left-right alignment is performed is a portion at the end of the curved line section. By definition, the posture convergence section does not include the last straight line section. This is because the straight line section is a section for maintaining the posture angle of the vehicle and the left-right alignment is completed. That is, the position accuracy in the posture convergence section may be given more importance than the position accuracy at the parking position, and the feature point registration in the posture convergence section may be given priority over the feature point registration at the parking position.

As described above, the posture convergence section may be determined as a section where the driver performs the left-right alignment, or may be determined geometrically. In the posture convergence section, the feature points may be arranged such that the left-right position accuracy is obtained. For example, as shown in FIG. 22, in a case where the vehicle is parked on pallet 242, it is suitable for the left-right alignment in the posture convergence section when feature point 244 at the entrance of pallet 242 is registered on the map. Feature point 244 at the entrance of pallet 242 is hidden under the vehicle body and thus the sensitivity is lost in a case where vehicle 1 enters pallet 242. However, since the left-right alignment is completed before pallet 242, there is no problem even in a case where the sensitivity of feature point 244 at the entrance is lost while traveling straight on pallet 242.

The feature points having good sensitivity with respect to a position change in the left-right direction are feature points in the optical axis direction of front-rear cameras 2 of vehicle 1, and the optical axis direction of front-rear cameras 2 is a tangent direction of the parking route in a bird's-eye view. Further, a feature point closer to front-rear cameras 2 of vehicle 1 has higher sensitivity. Therefore, in the posture convergence section in which a posture angle of vehicle 1 varies and the difference between the posture angle and a posture angle of vehicle 1 at the parking position is equal to or smaller than the predetermined angle threshold value, map generator 120 may preferentially register the feature points that is located in the tangent direction of the posture convergence section and is close to the posture convergence section on the map.

Figure 23:
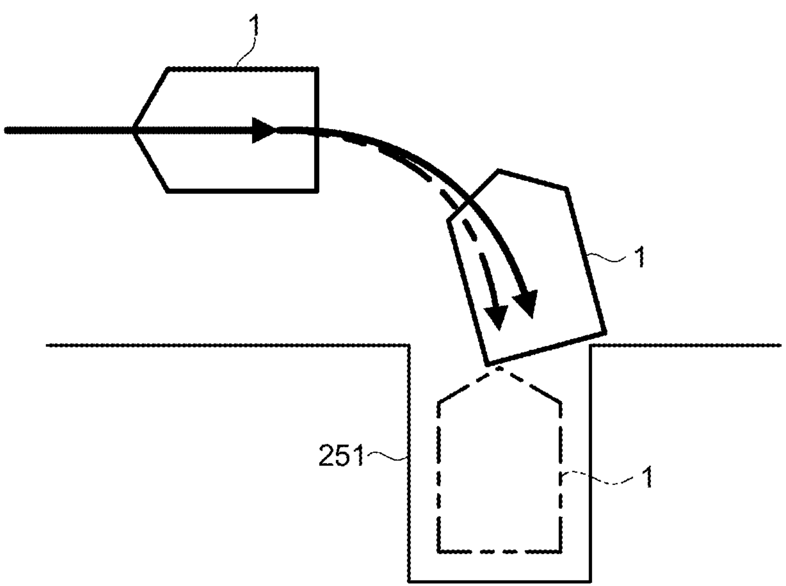
FIG. 23 illustrates a turning section that requires the accuracy in the left-right direction.

FIG. 23 illustrates a turning section that requires accuracy in the left-right direction. Vehicle 1 has a property of going straight when the steering wheel is released, which is referred to as straightness. The vehicle is turned in a case where the steering wheel is turned to change the direction and the vehicle is made to travel, but in a case where the road surface is wet and the front wheels slip or the grip with the road surface is weakened, the course may deviate to the outside due to the straightness. As shown in FIG. 23, in a case where the position in the left-right direction is shifted when the vehicle is turned at the frontage of parking space 251, the vehicle may not be parked.

In order to prevent such a situation, it is necessary to detect misalignment in the left-right direction (left-right misalignment) in the curved line section and to control the steering angle such that the vehicle does not deviate from the route. The left-right misalignment is likely to occur in a case where the steering angle is large and the rotation radius is small. Therefore, a curve section in which the absolute value of the steering angle is equal to or larger than a predetermined steering angle threshold value is particularly distinguished as a turning section, and the position accuracy in the left-right direction may be increased in the turning section.

As described above, since the posture convergence section may be a portion at the end of the turning section, a section corresponding to any of the posture convergence section or the turning section may be a section for improving the position accuracy in the left-right direction. In addition, the entire one curved line section having a large steering angle may be the section for improving the position accuracy in the left-right direction.

Figure 24:
FIG. 24 is a diagram describing sensitivity in the left-right direction in a case where the vehicle is turning.
Figure 24:
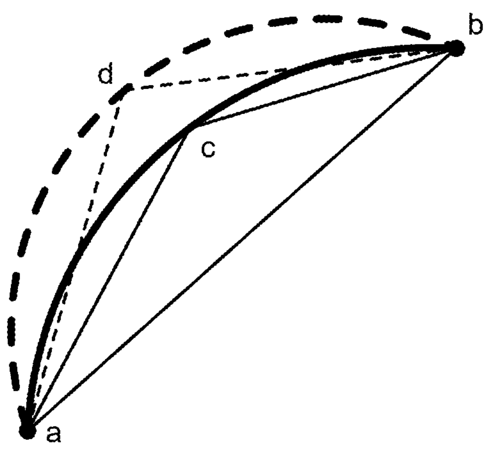

FIG. 24 illustrates sensitivity in the left-right direction in a case where vehicle 1 is turning. The feature points captured in the optical axis direction of front-rear cameras 2 of vehicle 1 have sensitivity to the left-right misalignment, but the optical axis direction of cameras 2 is not constant because the orientation (traveling direction) of vehicle 1 varies in the curved line section. Therefore, the definition of the direction in the curved line section and the condition for a feature point to be given priority will be organized below. In the curved line section, the vehicle turns with a rotation radius corresponding to the steering angle; hence, a case where the rotation radius is constant and the curved line section forms an arc which is a part of the circumference is organized as a model. In this case, the left-right direction may be rephrased as a radial direction, and the front-rear direction may be rephrased as a circumferential direction.

FIG. 24 shows a case where the curved line section is arc acb that passes through point c from point a and reaches point b. In a case where vehicle 1 is at point c and the azimuths of the points a and b with respect to vehicle 1 are observed by cameras 2, the difference in azimuth between the points a and point b represented by ∠acb is constant regardless of where point c is on arc acb by the inscribe angle theorem.

However, in a case where vehicle 1 deviates outward from the curved line section (arc acb) and is at the point d, the difference in azimuth between the point a and point b represented by the ∠adb is smaller than that of a case where vehicle 1 is on the parking route, such as ∠adb<∠acb. Therefore, it is found that the feature points on points a and b or arc acb have constant sensitivity in a case of detecting the positions in the left-right direction.

Figure 25:
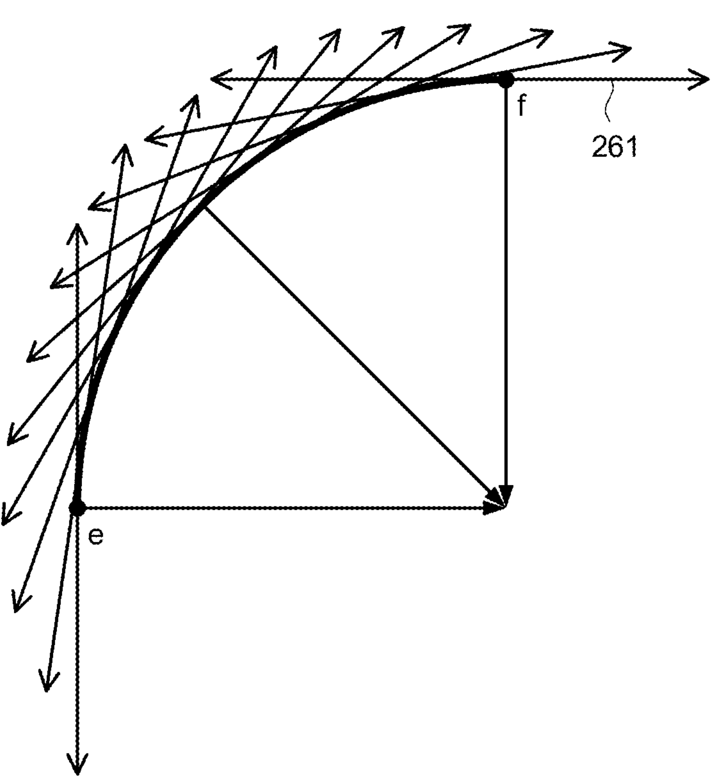
FIG. 25 is another diagram describing sensitivity in the left-right direction in a case where the vehicle is turning.

FIG. 25 illustrates sensitivity in the left-right direction in a case where vehicle 1 is turning. FIG. 25 is a view in which points on arc ef are sampled at equal intervals and arrows 261 representing the front-rear direction of vehicle 1 are plotted assuming that vehicle 1 is at the sampled points. The front-rear direction of vehicle 1 is also a tangent direction of arc ef. As shown in FIG. 25, in the section where vehicle 1 is turning, the front-rear direction of vehicle 1 faces the outside of the arc; hence, it may be said that feature points having good sensitivity in the left-right direction are located outside the arc. Therefore, map generator 120 may preferentially select a feature point that is located outside the arc and close to the arc as the feature point having high sensitivity in the left-right direction.

In contrast, a center of the arc is always located in the just beside direction regardless of the position in the left-right direction or the position in the front-rear direction of vehicle 1, and thus, the angle as viewed from vehicle 1 is not changed so much. Therefore, it can be said that, in a center of the arc, the motion parallax is small and the sensitivity is low (the contribution to the position accuracy is small). Therefore, in a case where the route draws an arc, map generator 120 may evaluate feature points based on the positional relationship between each feature point and the route, and may register a feature point in the front-rear direction of the vehicle or outside the arc more easily on the map than a feature point inside the arc.

Since the front-rear direction of vehicle 1 is also a tangent direction, map generator 120 may preferentially select a feature point that is in the tangent direction and close to the curved line section, as in the posture convergence section. As a result, a feature point that is located outside the arc and close to the arc is preferentially selected.

FIG. 26 illustrates a scene where vehicle 1 requires accuracy in the left-right direction. In a case where the vehicle passes through the side of an obstacle (for example, electric pole 271) or cuts back in front of the fence, the position accuracy is required in order to avoid contact. In manual parking, for such a case, a driver often decelerates vehicle 1. Thus, it may be estimated that the position at which vehicle 1 is decelerated or the position at which vehicle 1 travels at a low speed is close to the obstacle.

In addition, map generator 120 may determine that the approach to the obstacle based on the distance information obtained from the obstacle detection apparatus. That is, in a case where the vehicle speed is low or the vehicle is decelerated, or in a case where the distance to the obstacle is short, it is determined that the position accuracy is required. In addition, in a case where the distance to the obstacle is short and the vehicle speed is low or the vehicle speed is decreased, it may be determined that the necessity of the position accuracy is particularly high.

Specifically, the feature point selector (map generator 120) registers feature points based on the vehicle speed information indicating the vehicle speed of the vehicle or the distance information indicating the distance to the obstacle, and registers, on the map, the feature points at the position where the vehicle speed is low or deceleration occurs with priority over the position where the vehicle speed is high or no deceleration occurs, or registers, on the map, the feature points at the position where the distance between vehicle 1 and the obstacle is short with priority over the position where the distance between vehicle 1 and the obstacle is long.

A direction in which accuracy is required near an obstacle is not limited to the left-right direction. For example, in a case where the cut back is performed in front of the obstacle, the position accuracy in the front-rear direction is also required in order to prevent excessive advance and collision. Therefore, the range in which a feature point is preferentially selected may be varied between the passing point at which the vehicle passes without stopping and the stop point at which the vehicle stops, and a feature point close to the positions of the front-rear cameras or the optical axis direction of the front-rear cameras may be preferentially selected at the passing point, and a feature point close to the positions of the front, rear, left, and right cameras or the optical axis direction of the front, rear, left, and right cameras may be preferentially selected at the stopping point.

Alternatively, the priority for the feature point registration may be changed in accordance with the detection information on the obstacle. For example, in a case where no obstacle is detected on a front side of the cut-back position, there is no risk of collision even though the position accuracy in the front-rear direction is low, so that the priority of the feature points captured with the left-right cameras may be lowered.

In addition, the position accuracy should not be evaluated in two stages of whether or not it is necessary, but in a stepless manner in accordance with the distance, the vehicle speed, and the like, and in a case where a driver manually parks the vehicle, the position accuracy may be evaluated by combining information on the distance from the obstacle or the vehicle speed at a time of passing by or approaching the obstacle. For example, map generator 120 may evaluate feature points based on the vehicle speed and the change in vehicle speed, may grasp that the vehicle speed is small when the vehicle enters the garage and the vehicle speed is decreased before the garage, and may preferentially register a feature point near the camera before the garage.

Alternatively, map generator 120 may make it easy to register, with the vehicle speed as the only condition, a feature point located in the front-rear direction of vehicle 1 at the position where the vehicle speed is decreased and the vehicle speed is low, as compared with the position where the vehicle speed is high and the vehicle speed is not decreased, or may evaluate that the driver is reducing the vehicle speed as an indicator of the required position accuracy and then register more feature points closer to vehicle 1 as the vehicle speed decreases. That is, the evaluation may be performed using a combination of a plurality of conditions, but the combination is not essential.

Figure 27:
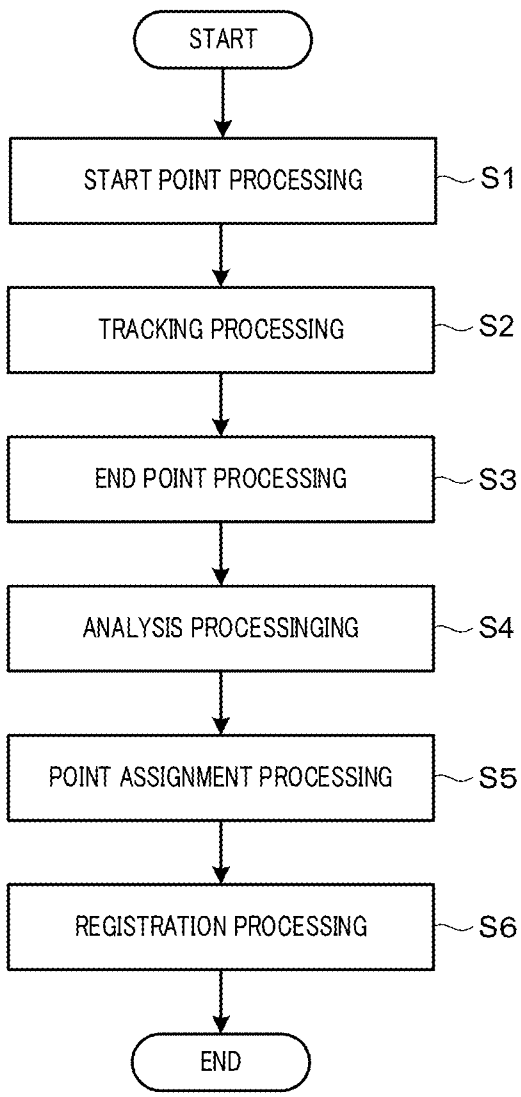
FIG. 27 is a flowchart of map generation according to the present embodiment.

FIG. 27 is a flowchart showing map generation according to the present embodiment. The processing of generating the map by the learning travel may be executed by map generator 120 of parking assistance apparatus 100 in the following steps.

In the start point processing, map generator 120 registers the GPS coordinates of a start position and collects the information on the detected feature points (step S1). In the tracking processing, map generator 120 tracks the feature points and specifies the coordinates of the feature points to collect the route information, such as the steering angle and the movement amount (step S2). In the end point processing, map generator 120 determines that the learning travel is completed (step S3).

In the analysis processing, map generator 120 specifies the terminal points and the sections of the parking route and organizes the feature points (step S4). In the point assignment processing, map generator 120 determines the number of feature points to be registered at each terminal point and in each section (step S5). In the registration processing, map generator 120 determines a feature point to be registered at each terminal point and in each section (step S6).

FIG. 27 shows a case where processing of setting the priority for registration or the number of feature points to be registered for each position on the route is first performed by evaluating the above-mentioned parking route in a bird's-eye view, and then, processing of selecting the feature point to be registered on the map based on a position of a camera or a relative position with respect to the optical axis direction of the camera at the position on the parking route is performed. That is, the processing of setting the priority for registration or the number of feature points to be registered corresponds to step S5, and the processing of selecting the feature point to be registered on the map based on the position of the camera or the relative position with respect to the optical axis direction of the camera at the position on the parking route corresponds to step S6. Hereinafter, details of each step will be described.

The description of the parking route will be made with reference to FIG. 2. A start point of the start point processing of S1 is start position 11 of the learning travel. At the start point, in automatic parking, information for enabling the first self-position estimation is acquired after specifying a map to be used from the GPS coordinates. First, map generator 120 acquires the GPS coordinates at start position 11 from navigation apparatus 40 and stores the GPS coordinates in a volatile region of storage 170. In addition, in the start point processing, map generator 120 collects the information on feature points detected at the start position, for use in the first self-position estimation in the automatic parking. Since the collected information is temporarily stored in the volatile region of storage 170, collection of the information by map generator 120 may be hereinafter paraphrased as writing the information in the volatile region of storage 170 by map generator 120.

The tracking processing of S2 is performed while vehicle 1 travels from start position 11 to parking position 14. During this time, map generator 120 performs tracking of feature points, and for a feature point that can be tracked, map generator 120 calculates the coordinates of the feature point and collects the feature point information including the coordinates. In addition, in the tracking processing, map generator 120 collects the route information, such as the steering angle, the vehicle speed, the gear position, the movement direction, and the movement distance, and the detection information of an obstacle.

The end point of the end point processing of S3 is parking position 14 where the vehicle is parked by the learning travel, and is confirmed as the end point in a case where the gear position is set to parking (P). In a case where map generator 120 executes the tracking processing at a point at the time when the end point is confirmed, the tracking processing is ended and the analysis processing is performed under a condition that the gear position is P. That is, the end point processing is a step of determining the start of the analysis processing.

In the analysis processing of S4, map generator 120 analyzes the parking route to specify terminal points and sections. In the next point assignment processing, map generator 120 gives the assignment point to each of the terminal points and the sections; hence, the analysis processing may be referred to as preprocessing for the point assignment processing.

S1 to S3 are processing during the learning travel, and S4 and subsequent steps are processing after the learning travel. Map generator 120 gives priority to collecting data during the learning travel and performs other processing after the learning travel. For example, during the learning travel, map generator 120 records the data on the small sections received from traveling controller 160 or the time series of data on the fold points as they are in storage 170, and analyzes the parking route to specify the sections and the terminal points after the learning travel.

For example, map generator 120 receives a parking route polygonal in a broken line shape composed of a large number of small sections, from traveling controller 160. Then, in the analysis processing of S4, map generator 120 merges the plurality of small sections to reconfigure the parking route into a small number of sections divided into a small number of terminal points. For example, map generator 120 may analyze the time series of the data on the small section, merge a series of small sections in which the steering angle is not changed before and after the series of small sections to be merged, into a section, and set fold points (change points of the steering angle) at which the steering angle is changed before and after the fold points as terminal points. Alternatively, the parking route may be analyzed in a bird's-eye view and thus approximated by a small number of straight line sections and a small number of curved line sections that are divided at terminal points less than the fold points in number.

Map generator 120 registers the parking route that has been simplified by the reconfiguration or the approximation, as the automatic parking route. That is, map generator 120 makes the number of terminal points of the automatic parking route smaller than the number of the fold points of the parking route in the learning travel. In the automatic parking, since an occupant feels uneasy every time the vehicle passes through the terminal point (change point of the steering angle), the number of times the occupant feels uneasy is reduced and the feeling of use is improved by simplifying the parking route during the learning travel in a bird's-eye view and reducing the number of terminal points of the automatic parking route.

It is advantageous that map generator 120 makes the number of terminal points smaller than the number of fold points also in terms of accuracy. Since the change point of the steering angle is a point at which the control of changing the steering angle is performed in automatic parking, the feature points should be preferentially arranged around the change point in order to obtain the position accuracy. However, in a case where all the fold points are set as the terminal points, the number of feature points per terminal point is reduced. Therefore, map generator 120 may reduce the number of sections by simplifying the route to reduce the number of terminal points to which the feature points are assigned. In this way, since a position not requiring the position accuracy is excluded from the terminal point, a large number of feature points can be arranged at a position (terminal point) requiring the position accuracy.

Alternatively, map generator 120 may treat fold points (change points in the steering angle) of the automatic parking route and terminal points to which feature points are assigned as different points from each other to reduce the number of terminal points to which the feature points are assigned, but not change the fold points (change points in the steering angle) of the parking route. That is, map generator 120 may reduce the number of terminal points to which the feature points are assigned without changing the parking route to be registered by setting the majority of the change points in the steering angle as the fold points to which the feature points are not assigned. The fold points (change points in the steering angle) to which the feature points are not assigned are each referred to as a recessive terminal point, and setting as the fold point to which the feature points are not assigned may be referred to as setting as a recessive terminal point.

Figure 28:
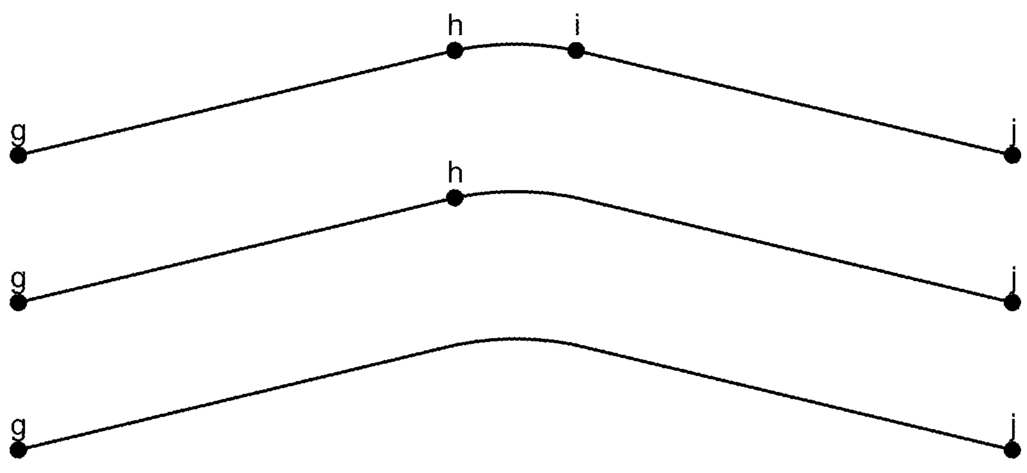
FIG. 28 illustrates adjustment of a terminal point.

FIG. 28 illustrates adjustment of the terminal points. For example, in a case where section gh and section ij of the parking route passing through points g, h, i, and j are straight line sections and section hi is a short curved line section, map generator 120 evaluates the relationship between the parking route and the parking position or the obstacle. Then, in accordance with the evaluation result, map generator 120 may regard one or both point h and point i as a recessive terminal point(s) and exclude from the terminal points to which the feature points are assigned.

For example, in a case where point j is evaluated as parking position 14 and a between point h and point i, that is, section hi is a posture convergence section for adjusting the posture and the position in the left-right direction of the vehicle, map generator 120 may leave both point h and point i as the terminal points to which the feature points are assigned. For example, in a case where the obstacle is detected in the vicinity of point h, map generator 120 evaluates that the position accuracy in the left-right direction of the vehicle is required in the vicinity of point h, and point h is left as a terminal point to which the feature point is assigned, but point i is set as a recessive terminal point (fold point) and may be excluded from the terminal points to which the feature point is assigned.

For example, in a case where point j is not located the vicinity of parking position 14, and no obstacle is detected in the vicinity of point h or point i, map generator 120 may evaluate that the position accuracy is not required at point h or point i, and may exclude both point h and point i from the terminal points to which the feature points are assigned by regarding point h and point i as the recessive terminal points (fold points).

In this case, map generator 120 may approximate section gj with a large arc by assuming point h and point i as not existing, and register section gj as one curved line section gj without a fold point in the middle, on the map, or may leave point h and point i as the recessive terminal points (fold points) and register three sections, gh, hi, and ij, in which there is a steering angle change at the fold points in the middle, on the map. In any case, the number of feature points assigned to one terminal point can be increased by reducing the number of feature points in the vicinity of point h or point i. In summary, it may be said that the analysis processing performed by map generator 120 is processing of analyzing the parking route during the learning travel and making the number of terminal points to which the feature points are assigned smaller than the number of fold points, which is the change point of the steering angle during the learning travel.

Figure 29:
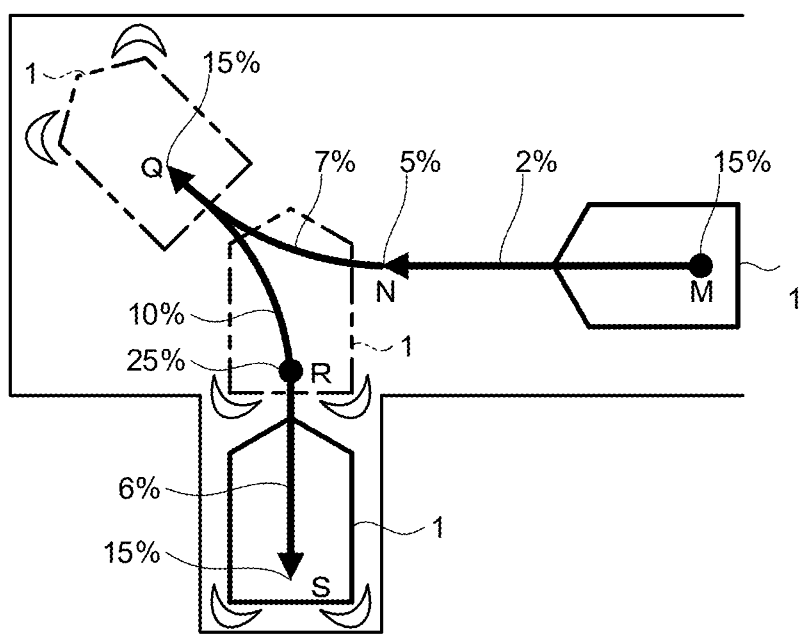
FIG. 29 illustrates an example of point assignment for a terminal point to and a section.

FIG. 29 illustrates an example of the point assignment to the terminal points and the sections. In the point assignment processing of S5, map generator 120 determines the upper limit of the number of feature points to be registered (assignment point) at the terminal point or in the section. In this case, map generator 120 evaluates the relationship between the terminal points or the sections and the parking position or an obstacle, and a change amount in steering angle or posture, and changes the assignment point accordingly.

For example, map generator 120 increases the assignment point as a terminal point or a section are closer to the parking position S. Since the user evaluates whether or not parking is performed well at the parking position S, it is sufficient that the accuracy is higher as the route length to the parking position S is shorter. The assignment point may be adjusted in accordance with the risk. For example, since the risk is high near the obstacle, it is preferable to increase the assignment point of a terminal point or a section around the obstacle. In addition, map generator 120 may estimate that a section in which the driver travels at a low speed has a higher risk than a section in which the driver travels at a higher speed, and may increase the assignment point.

Map generator 120 evaluates a change amount of the steering angle or the posture angle of the vehicle and reflects the evaluated change amount on the point assignment. This is because the larger the change amount in the steering angle or the posture angle is, the higher the risk of the left-right misalignment is. The change amount in the posture angle is a change amount in a posture angle (the posture indicated by the front of the vehicle) of the vehicle between the start point and the end point of the section. The position accuracy in the left-right direction is required also in the posture convergence section, and the posture convergence section is a section in which a difference between the posture angle of the vehicle and a posture angle of the vehicle at the parking position is equal to or smaller than a predetermined angle threshold value. Therefore, the feature point selector may evaluate the change amount in the steering angle of the vehicle or the posture angle of the vehicle to preferentially register, on the map, a feature point in a section in a tangent direction or increase the number of feature points to be registered by increasing the assignment point, in any of a turning section in which the steering angle is equal to or greater than a predetermined threshold value, the change amount in the posture angle in the section is equal to or greater than a predetermined threshold value, and the posture convergence section in which the difference between the posture angle of the vehicle and the posture angle of the vehicle at the parking position is equal to or less than a predetermined angle threshold value.

With respect to the terminal point and the section, the point assignment to the terminal point is given priority over the point assignment to the section, and the assignment point to the terminal point is made more than the assignment point to the section. In the example in FIG. 29, terminal points M, N, Q, R, and S are given 75% of the assignment point, but since the feature points around the terminal points can be detected in the sections before and after the terminal points, the small point assignment of the sections causes no problem. Since the point assignment to the section is for enabling the position estimation between the terminal points, map generator 120 may assign more points to a particularly long section if present.

Terminal point M is a start point, and the automatic parking cannot be started in a case where the self position cannot be estimated at the start point; thus, terminal point M is given a high assignment point. The next terminal point having a high assignment point is R. Vehicle 1 has completed the adjustment of the lateral position and the posture at R, and the portion at the end of section QR is also the posture convergence section, so that the portion at the end of section QR is preferentially given an assignment point than the parking position S. That is, the priority or the assignment point is determined in accordance with the necessity of the position accuracy, instead of determining the priority only by the route length to the parking position S. For example, the assignment point of terminal point R is set to be high in a case where the vehicle is close to the obstacles on the left and right sides in section RS and it is difficult to correct the posture after terminal point R.

Since Q is a cut-back position and S is a parking position, both are stop points close to an obstacle, and are given a high assignment point in order to obtain the position accuracy in the front-rear direction. Nis a turning start point but is a passing point, which has a long route length to parking position S and is not close to the obstacle. Therefore, N is given a lower assignment point than the other terminal points.

In the section, QR including the posture convergence section is given the highest assignment point. NQ having the same rotation radius as QR is away from the parking position and is thus given a lower assignment point than QR, but has a higher assignment point than straight line section MN and straight line section RS. Since straight line section MN has a longer route length to parking position S than straight line section RS and is thus given a lower assignment point.

In the registration processing of S6, map generator 120 first determines the order in which the feature points are determined, and then determines the feature points to be registered at each terminal point and in each section. The order in which the feature points are determined may be set to prioritize the determination of the feature points of the terminal points over the determination of the feature points of the sections, or may be set to prioritize the feature points having a shorter route length to parking position S or the feature points having a higher assignment point. For example, the order of point S, section RS, point R, section QR, point Q, section NQ, point N, section MN, and point M is possible, or the order of point R, point S, point Q, point M, section QR, section NQ, section RS, point N, and section MN is also possible. In addition, map generator 120 may perform the processing on the section after performing all the processing on the terminal points in the order of point R, point S, point Q, point M, point N, section QR, section NQ, section RS, and section MN.

In the registration processing, map generator 120 performs density restriction for avoiding concentration of feature points in a narrow range. For example, around a feature point (marker) registered earlier, the registration of feature points is prohibited or the evaluation values of the feature points are reduced (lateral suppression. That is, as a side effect of the density restriction, the feature point registered earlier prevents the peripheral feature points from being registered later. The reason why the feature point registration at the terminal point or in the section having a high importance is performed first in a case of determining the order in which the feature points are determined is to avoid that a feature points having good sensitivity cannot be registered due to the density restriction.

Map generator 120 adjusts a parameter for the density restriction in accordance with the assignment point in order that a sufficient number of the feature points can be registered at a position requiring the position accuracy, and adjusts the threshold value of the density restriction, the strength of the lateral suppression, and the like such that the density is increased at a position with a high assignment point. This can be rephrased as follows: the feature point selector includes a density restrictor that restricts the density of feature points to be registered; and the density restrictor varies the density in accordance with the position on the parking route, and, in a position where the priority for registering feature points is high or where a large number of feature points is registered, sets the density to be higher than in a position where the priority is low or where a small number of feature points is registered. That is, at a position where the position accuracy is required, the restriction by the density restrictor is relaxed, thereby concentrating the feature points in a narrow range.

Figure 30:
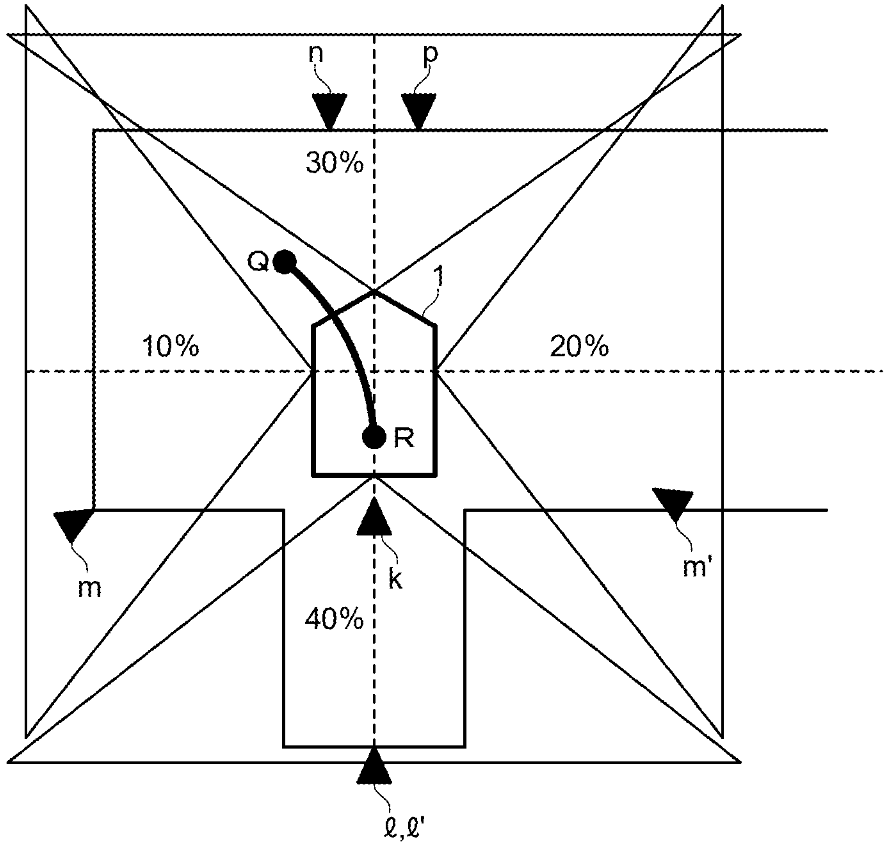
FIG. 30 illustrates feature point registration at a terminal point.

FIG. 30 illustrates the feature point registration at terminal point R, which is an end point of curved line section QR that is turning toward the parking position. In a case of registering feature points of terminal point R, map generator 120 selects a camera to be used as an evaluation standard in accordance with a direction requiring accuracy, evaluates an angle of each feature point with respect to an optical axis of the camera and a difference in height and a distance between the feature point and the camera, with the selected camera as a reference, and preferentially registers a feature point located at a position advantageous for obtaining accuracy.

For example, since the position accuracy in the left-right direction is required at terminal point R, map generator 120 selects feature points captured in center portions of the front-rear cameras. In a case where feature points k, l, and m are captured with the rear camera, feature points k and l are in the optical axis direction of the camera, but feature point k is closer to the camera; hence, map generator 120 increase the priority of feature point k. Although l and m are at the same distance from the camera, m has a large angle from the optical axis and is captured at the peripheral portion; hence, map generator 120 lowers the priority of m. In a case where there is feature point l' having the same position as feature point I on the plane and having a smaller difference in height from the camera than l, map generator 120 gives priority to l' over l. In a case where only one of l or l' can be registered due to the density restriction, map generator 120 may register feature point l' having a small difference in height from the camera and exclude feature point l having a large difference in height.

In this way, map generator 120, for example, determines the priority as k>l'>m and determines the range of the feature points to be registered in accordance with the assignment point. For example, in a case where the number of feature points to be registered (assignment point) in the visual field range of the rear camera is three, map generator 120 registers all of k, l', and m. However, in a case where the assignment point is low, only k and l' or only k is registered. In reality, since the number of feature points to be registered in the visual field range of the rear camera at the end point of the posture convergence section is four or more, feature points l, m, and m' at the positions disadvantageous in terms of obtaining the accuracy may be registered. In addition, the feature points within the visual field, which are not shown in the drawing, may be registered until the number of feature points determined by the assignment point is reached, and in this case, the feature points advantageous for obtaining the accuracy may be preferentially registered.

For example, the evaluation value of each feature point is calculated based on the angle with respect to the optical axis direction of the rear camera or the difference in height from the camera, and then, the feature point having the highest evaluation value is first registered. In a case where one feature point is registered, evaluation values of feature points near this feature point are reduced in order to restrict the density. Next, the feature points are sorted again based on the updated evaluation values, and the feature point having the next highest evaluation value is registered. Such processing with one cycle of the density restriction, the sorting, and the registration may be repeated a number of times determined by the assignment point.

When selecting the feature points of the terminal points, map generator 120 may perform the selection in consideration of the preceding and succeeding sections. For example, in a case where feature point n and feature point p are present in the visual field range of the front camera and only one of the feature points can be registered due to the density restriction, map generator 120 may evaluate that feature point n is closer to the optical axis direction of the front camera than the feature point p during the traveling on section QR, and may preferentially register feature point n. Alternatively, the evaluation values of the feature points may be added by evaluating the position with respect to the preceding and succeeding sections, and the feature points may be registered in descending order of the evaluation values of the feature points. Both feature point n and feature point p are subject to point addition since both feature point n and feature point p are located outside the arc of curved line section QR, but feature point n is closer to the arc, so that feature point n is given more points. In addition, since the portion before R corresponds to the posture convergence section, map generator 120 may register both feature point n and feature point p by adjusting the threshold value of the density restriction.

In a case where the feature points of the terminal points are registered, map generator 120 assigns the number of feature points to be registered for each camera in accordance with the direction and the traveling direction that require accuracy. For example, map generator 120 perform an inclined point assignment on the all cameras such that 40% is assigned to the rear camera facing the traveling direction, 30% is assigned to the front camera facing the opposite direction, 20% is assigned to the right camera facing the outside of route QR, and 10% is assigned to the left camera facing the inside of route QR, in accordance with the traveling direction and the direction requiring accuracy while being inclined.

In this way, the registration of not only the feature points in the direction requiring the accuracy but also the feature points in the other directions makes it easy to maintain the function even in a case where the environment is changed. That is, the robustness is improved. For example, in a case where only feature points k and l' at the rear and feature point n at the front are registered and feature points m and m' on the left and right are not registered for the reason that the position accuracy in the left-right direction is required, the automatic parking may not be performed due to a change in environment. For example, in a case where feature points k and l' in the rear are in a garage and the rear camera image is completely black due to the direction of sunlight, making it impossible to detect the feature points, the self-position estimation cannot be performed because the position of the vehicle is not determined only by feature point n at the front, and therefore, the automatic parking cannot be continued. In that respect, in a case where the feature points captured in the left-right cameras, such as m and m', are also registered, the self-position estimation can be performed based on the detection points in three directions of the front, left, and right directions even when the rear camera image is completely black.

The purpose of the density restriction for avoiding concentration of the feature points in a narrow range is the same. For example, in a case where only feature points located in a close narrow range are registered but the feature points are those of a vehicle that has been parked nearby, the automatic parking may not be performed or the parking position may be shifted when the vehicle is no longer present or the position of the vehicle is changed.

For example, in a case where a feature point at a position higher than the camera is selected, the probability that the feature point belongs to the other vehicle is low, and in a case where a feature point at a position away from the camera is selected, the probability that the feature point is not on the road is high. That is, even with respect to the difference in height or the distance from the camera, it is preferable to disperse the arrangement of the feature points.

Figure 31:
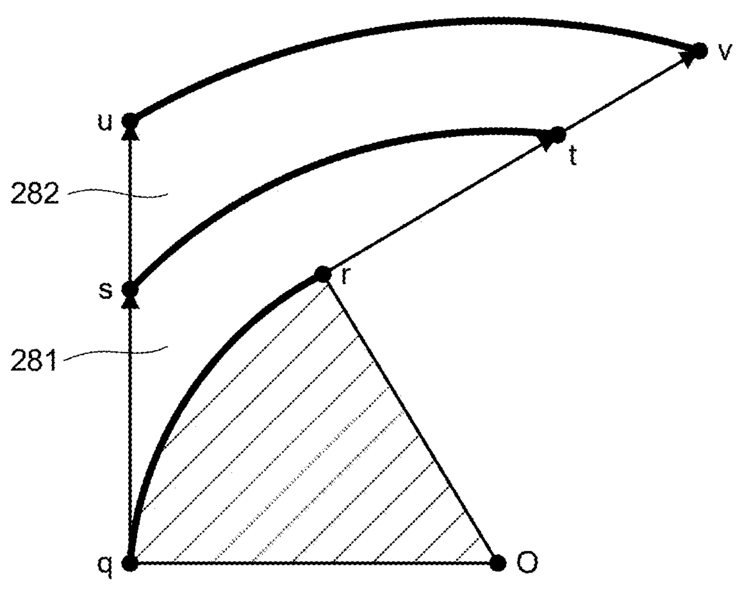
FIG. 31 illustrates a range of feature points to be registered in a curved line section.

FIG. 31 illustrates a range of feature points to be registered in the curved line section. For each feature point, the position and the optical axis direction of the camera are determined, whereas in the curved line section, the position and the optical axis direction of the camera are changed. Therefore, map generator 120 may evaluate the feature points with reference to a trajectory along which the position of the camera moves in the section or a range in which the optical axis direction varies.

For example, in a case where arc qr is a trajectory of the camera in the traveling direction and the optical axis direction varies from direction qs to direction rt, it can be said that range 281 surrounded by arc qr, arc st, line segment qs, and line segment rt is a range that is close to the camera and hits the optical axis direction. In addition, it can be said that range 282 surrounded by arc st and arc uv, line segment su, and line segment tv of FIG. 31 is a range with the same conditions for the optical axis direction and is farther from the camera. Therefore, a feature point in range 281 may be given a higher evaluation value than that of a feature point in range 282, and the feature point having a high evaluation value may be preferentially registered.

As described above, in the curved line section, map generator 120 may specify a range with the same conditions for the optical axis direction, and evaluate the feature points within the range in accordance with the distance with respect to the camera position. In addition, as a simpler method, map generator 120 may evaluate the feature points by a distance from the trajectory of the camera.

Figure 32:
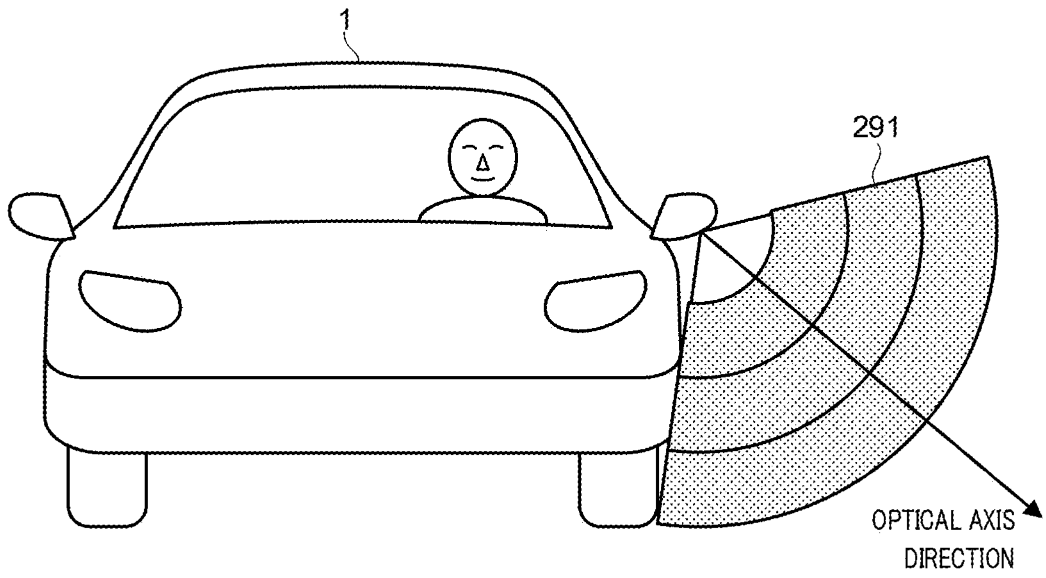
FIG. 32 illustrates a range of feature points to be registered in a straight line section.

FIG. 32 illustrates a range of the feature points to be registered in the straight line section. In the straight line section, the optical axis directions of the front-rear cameras do not change, and the optical axis directions of the left-right cameras move in parallel; hence, the relationship between the cameras and the feature points is determined by the distance between the trajectories of the cameras and the feature points. Therefore, map generator 120 may evaluate the feature points by dividing the space into region 291 with annular rings (or baumkuchen-like) having the same distance from the trajectory of the camera, for example, with reference to each of the trajectories of the left-right cameras. For example, in a range on one annular ring in which the distance from the trajectory of the camera is the same, a feature point having a small angular difference from the optical axis of the camera may be given priority, and for the feature points having the same angular difference from the optical axis of the camera, a feature point having a short distance from the trajectory of the camera may be given priority. In addition, map generator 120 may change the evaluation standard to preferentially select a feature point having a small difference in height from the camera in a range of one annual ring in which the distance from the camera is the same. This evaluation method can be performed even in a curved line section.

In addition, in a case of registering a feature point, the distance of the feature point to be registered preferentially may be added or subtracted according to the assignment point. A close feature point has a high maximum value of sensitivity, but the range in which the sensitivity is high is narrow: hence, the sensitivity is rapidly decreased as the distance from the feature point increases. In addition, the close feature point may enter a blind spot of the vehicle, and the sensitivity becomes zero in a case where the feature point enters the blind spot of the vehicle. Therefore, the feature point selector evaluates the feature points based on a distance between the position on the parking route and each feature point, and registers a feature point at which the distance is long on the map in a case where the position on the parking route is a position at which the priority for registration of the feature point is low or a position at which the number of feature points to be registered is small with priority over in a case where the position on the parking route is a position at which the priority for registration of the feature point is high or a position at which the number of feature points to be registered is large. Since the position with a high priority and a large number of points to be registered is a position where the assignment point is high, it may be said that, in a case where the assignment point is high, the close feature point is prioritized, and in a case where the assignment point is low, the distant feature point is prioritized. In this way, at a position where the assignment point is low, the distant feature points are preferentially registered, so that the position accuracy in the section can be secured with a small number of the feature points.

In addition, map generator 120 may prioritize the shorter route length to the parking position and may register the feature points in order, starting from the closest one to the end point even in one section. This is because, in order to avoid that a feature point present at a position advantageous for obtaining the accuracy is not registered due to the density restriction, around the end point that requires higher accuracy. Therefore, for example, an inclination addition point at which more points are added as the feature point closer to the end point is performed on the evaluation value of the feature points as the registration candidates in one section, and the feature point closer to the end point may be registered first.

In a case where the feature point registration at the terminal point is performed first, the feature points are already registered around the start point and the end point of the section. In particular, in the straight line section, the position accuracy in the left-right direction can be secured by the feature points registered at the front and rear terminal points. Therefore, in a case where the feature point registration of the terminal point is performed first, map generator 120 may register the feature points on the left and right sides with the left-right cameras as a reference as the feature point registration in the section to secure the position accuracy in the front-rear direction. In addition, in the feature point registration in the curved line section, map generator 120 may preferentially register a feature point outside the arc over a feature point in the center direction of the arc.

Other embodiments that can be achieved by making various modifications to the embodiment, or by optionally combining the components and functions in the embodiment without departure from the spirit of the present disclosure, are also included in the present disclosure.

The disclosure of Japanese Patent Application No. 2023-183888, filed on Oct. 26, 2023 including the specification, drawings and abstract, are incorporated herein by reference in its entirety.

INDUSTRIAL APPLICABILITY

The present disclosure is applicable to parking assistance apparatuses and parking assistance methods.

REFERENCE SIGNS LIST

1 Vehicle
2 Camera
10 Operation apparatus
11 Start position
12 Terminal point
14 Parking position
20 HMI apparatus
30 Vehicle control apparatus
40 Navigation apparatus
100 Parking assistance apparatus
101 CPU
102 ROM
103 RAM
104 I/O
105 IMP
110 State manager
120 Map generator
130 Image processor
140 Feature point detector
150 Position estimator
160 Traveling controller
170 Storage
180 Notifier
201 Fisheye image
202 Distortion correction
203 Image after distortion correction
211 Pole
213 Convex portion
241 Parking space
242 Pallet
261 Arrow
271 Electric pole

The invention claimed is:

1. A parking assistance apparatus, comprising:

a processor; and at least one memory configured to store a map and including a program that, when executed by the processor, causes the processor to:

acquire a camera image from each of a plurality of cameras for viewing in different directions respectively around a vehicle;

extract feature points from the camera image;

select a feature point to be registered on the map by evaluating the feature points in learning travel in which the vehicle is manually parked and a parking route and a parking position of the vehicle are registered on the map; and park the vehicle based on the map in automatic parking, wherein the processor is configured to vary a priority for registration of the feature points or the number of the feature points for registration in accordance with a position on the parking route, or select, at the position on the parking route, the feature point to be registered on the map, based on a position of one of the plurality of cameras or a relative position of the feature point with respect to an optical axis direction of one of the plurality of cameras, and the processor is configured to evaluate, with reference to a trajectory of one of left-right cameras included in the plurality of cameras, the feature point by dividing a space to obtain a region with annular rings having a same distance from the trajectory of the one of the left-right cameras, and preferentially register, on the map, the feature point at which a difference in angle with the optical axis direction of the one of the left-right cameras is smaller than a difference in angle of another feature point, in a range on one of the annular rings having the same distance from the trajectory of the one of the left-right cameras, and preferentially register, on the map, the feature point at which a distance from the trajectory of the one of the left-right cameras is shorter than a distance from the trajectory of another feature point, for the feature points having a same difference in angle with the optical axis direction of the one of the left-right cameras.

2. The parking assistance apparatus according to claim 1, wherein the processor is configured to evaluate the feature point based on a difference in height between one of the plurality of cameras and the feature point, and preferentially register, on the map, the feature point at which the difference in height is smaller than the difference in height of another feature point.

3. The parking assistance apparatus according to claim 1, wherein the processor is configured to evaluate the feature point based on an angle of the feature point with respect to the optical axis direction of the one of the plurality of cameras, and preferentially register, on the map, the feature point at which the angle is smaller than an angle of another feature point.

4. The parking assistance apparatus according to claim 1, wherein the processor is configured to evaluate the feature point based on a distance between the position on the parking route and the feature point, and preferentially register, on the map, the feature point at which the distance between the position on the parking route and the feature point is longer than a distance between the position on the parking route and another feature point, in a case where the position on the parking route is a position at which a priority for registration of the feature point is lower than a priority for registration of another position, or in a case where the position on the parking route is a position at which the number of the feature points to be registered is smaller than a number of the feature points of another position.

5. The parking assistance apparatus according to claim 1, wherein the processor is configured to register the feature point in accordance with the position on the parking route, and register the feature point to be registered at a terminal point with priority over the feature point to be registered in a section, or increase the number of the feature points to be registered at the terminal point to be more than the number of the feature points to be registered in the section.

6. The parking assistance apparatus according to claim 1, wherein the processor is configured to evaluate a steering angle of the vehicle or a posture angle of the vehicle, and register with priority, on the map, in any section of a turning section and a posture convergence section, the feature point in a tangent direction of the section, or increase the number of the feature points to be registered, the turning section being a first section in which the steering angle is equal to or greater than a first predetermined threshold value or a change amount of the posture angle in the first section is equal to or greater than a second predetermined threshold value, the posture convergence section being a second section in which a difference between the posture angle of the vehicle and a posture angle of the vehicle at the parking position is equal to or less than a predetermined angle threshold value.

7. The parking assistance apparatus according to claim 1, wherein the processor is configured to register the feature point based on vehicle speed information indicating a vehicle speed of the vehicle or distance information indicating a distance between the vehicle and an obstacle, and preferentially register the feature point at a position at which the vehicle speed is lower than the vehicle speed at another position or deceleration is present, or preferentially register the feature point at a position at which the distance between the vehicle and the obstacle is shorter than the distance between the vehicle and the obstacle at another position.

8. The parking assistance apparatus according to claim 1, wherein the processor is configured to evaluate a route length between the position on the parking route and the parking position, and preferentially register the feature point to be registered at a position at which the route length is shorter than the route length of another position, or preferentially register more feature points at the position at which the route length is shorter than the route length at another position.

9. The parking assistance apparatus according to claim 1, wherein:

the processor is configured to restrict a density of the feature points to be registered, and the processor is configured to vary the density in accordance with the position on the parking route, and increase the density at a position at which a priority for registration of the feature points is higher than the priority for registration at another position or at a position at which a number of the feature points to be registered is larger than the number of the feature points to be registered at another position.

10. A parking assistance method, comprising:

acquiring a camera image from each of a plurality of cameras for viewing in different directions respectively around a vehicle;

extracting feature points from the camera image;

selecting a feature point to be registered on a map by evaluating the feature points in learning travel in which the vehicle is manually parked and a parking route and a parking position of the vehicle are registered on the map; and parking the vehicle based on the map in automatic parking, wherein, the selecting the feature point varies a priority for registration of the feature points or the number of the feature points for registration in accordance with a position on the parking route, or selects, at the position on the parking route, the feature point to be registered on the map, based on a position of one of the plurality of cameras or a relative position of the feature point with respect to an optical axis direction of one of the plurality of cameras, and the selecting the feature point evaluates, with reference to a trajectory of one of left-right cameras included in the plurality of cameras, the feature point by dividing a space to obtain a region with annular rings having a same distance from the trajectory of the one of the left-right cameras, and preferentially registers, on the map, the feature point at which a difference in angle with the optical axis direction of the one of the left-right cameras is smaller than the difference in angle of another feature point, in a range on one of the annular rings having the same distance from the trajectory of the one of the left-right cameras, and preferentially registers, on the map, the feature point at which a distance from the trajectory of the one of the left-right cameras is shorter than the distance from the trajectory of another feature point, for the feature points having a same difference in angle with the optical axis direction of the one of the left-right cameras.

11. The parking assistance method according to claim 10, wherein the selecting the feature point evaluates the feature point based on a difference in height between the one of the plurality of cameras and the feature point, and preferentially registers, on the map, the feature point at which the difference in height is smaller than the difference in height of another feature point.

12. The parking assistance method according to claim 10, wherein the selecting the feature point evaluates the feature point based on an angle of the feature point with respect to the optical axis direction of the one of the plurality of cameras, and preferentially registers, on the map, the feature point at which the angle is smaller than the angle of another feature point.

13. The parking assistance method according to claim 10, wherein the selecting the feature point evaluates the feature point based on a distance between the position on the parking route and the feature point, and preferentially registers, on the map, the feature point at which the distance between the position on the parking route and the feature point is longer than the distance between the position on the parking route and another feature point, in a case where the position on the parking route is a position at which a priority for registration of the feature point is lower than the priority for registration of another position, or in a case where the position on the parking route is a position at which the number of the feature points to be registered is smaller than the number of the feature points of another position.

14. The parking assistance method according to claim 10, wherein the selecting the feature point registers the feature point in accordance with the position on the parking route, and registers the feature point to be registered at a terminal point with priority over the feature point to be registered in a section, or increases the number of the feature points to be registered at the terminal point to be more than the number of the feature points to be registered in the section.

15. The parking assistance method according to claim 10, wherein the selecting the feature point evaluates a steering angle of the vehicle or a posture angle of the vehicle, and registers with priority, on the map, in any section of a turning section and a posture convergence section, the feature point in a tangent direction of the section, or increases the number of the feature points to be registered, the turning section being a first section in which the steering angle is equal to or greater than a first predetermined threshold value or a change amount of the posture angle in the first section is equal to or greater than a second predetermined threshold value, the posture convergence section being a second section in which a difference between the posture angle of the vehicle and a posture angle of the vehicle at the parking position is equal to or less than a predetermined angle threshold value.

16. The parking assistance method according to claim 10, wherein the selecting the feature point registers the feature point based on vehicle speed information indicating a vehicle speed of the vehicle or distance information indicating a distance between the vehicle and an obstacle, and preferentially registers the feature point at a position at which the vehicle speed is lower than the vehicle speed at another position or deceleration is present, or preferentially registers the feature point at a position at which the distance between the vehicle and the obstacle is shorter than the distance between the vehicle and the obstacle at anther position.

17. The parking assistance method according to claim 10, wherein the selecting the feature point evaluates a route length between the position on the parking route and the parking position, and preferentially registers the feature point to be registered at a position at which the route length is shorter than the route length of another position, or preferentially registers more feature points at the position at which the route length is shorter than the route length at another position.

18. The parking assistance method according to claim 10, wherein:

the selecting the feature point restricts a density of the feature points to be registered, and the selecting varies the density in accordance with the position on the parking route, and increases the density at a position at which a priority for registration of the feature points is higher than the priority for registration at another position or at a position at which a number of the feature points to be registered is larger than the number of the feature points to be registered at another position.

19. A non-transitory computer-readable recording medium storing therein a parking assistance program for causing a computer to execute processing, the processing comprising:

acquiring a camera image from each of a plurality of cameras for viewing in different directions respectively around a vehicle;

extracting feature points from the camera image;

selecting a feature point to be registered on a map by evaluating the feature points in learning travel in which the vehicle is manually parked and a parking route and a parking position of the vehicle are registered on the map; and parking the vehicle based on the map in automatic parking, wherein the selecting the feature point varies a priority for registration of the feature points or the number of the feature points for registration in accordance with a position on the parking route, or selects, at the position on the parking route, the feature point to be registered on the map, based on a position of one of the plurality of cameras or a relative position of the feature point with respect to an optical axis direction of one of the plurality of cameras, and the selecting the feature point evaluates, with reference to a trajectory of one of left-right cameras included in the plurality of cameras, the feature point by dividing a space to obtain a region with annular rings having a same distance from the trajectory of the one of the left-right cameras, and preferentially registers, on the map, the feature point at which a difference in angle with the optical axis direction of the one of the left-right cameras is smaller than the difference in angle of another feature point, in a range on one of the annular rings having the same distance from the trajectory of the one of the left-right cameras, and preferentially registers, on the map, the feature point at which a distance from the trajectory of the one of the left-right cameras is shorter than the distance from the trajectory of another feature point, for the feature points having a same difference in angle from the optical axis direction of the one of the left-right cameras.

* * * * *